United States Patent
Kawamura

(10) Patent No.: US 6,433,938 B1
(45) Date of Patent: Aug. 13, 2002

(54) ZOOM LENS SYSTEM

(75) Inventor: Kazuteru Kawamura, Hachioji (JP)

(73) Assignee: Olympus Optical Co., Ltd., Tokyo (JP)

(*) Notice: Subject to any disclaimer, the term of this patent is extended or adjusted under 35 U.S.C. 154(b) by 64 days.

(21) Appl. No.: 09/716,299

(22) Filed: Nov. 21, 2000

(30) Foreign Application Priority Data

Nov. 24, 1999 (JP) .......................................... 11-332460

(51) Int. Cl.$^7$ .............................................. G02B 15/14
(52) U.S. Cl. .................................................... 359/687
(58) Field of Search ................... 359/683, 687, 359/676

(56) References Cited

U.S. PATENT DOCUMENTS

| | | | |
|---|---|---|---|
| 4,871,239 A | 10/1989 | Masumoto et al. | 359/690 |
| 5,699,198 A | 12/1997 | Inadome et al. | 359/687 |
| 5,768,029 A | 6/1998 | Morooka | 359/687 |
| 5,815,321 A | 9/1998 | Shimo | 359/687 |
| 6,191,895 B1 * | 2/2001 | Arimoto et al. | 359/687 |

FOREIGN PATENT DOCUMENTS

| | | |
|---|---|---|
| JP | 57-168209 | 10/1982 |
| JP | 63-066522 | 3/1988 |
| JP | 63-294506 | 12/1988 |
| JP | 1-229217 | 9/1989 |
| JP | 2-153311 | 6/1990 |
| JP | 6-075167 | 3/1994 |
| JP | 8-220439 | 8/1996 |
| JP | 8-248319 | 9/1996 |
| JP | 9-101458 | 4/1997 |
| JP | 9-101459 | 4/1997 |

* cited by examiner

Primary Examiner—Scott J. Sugarman
(74) Attorney, Agent, or Firm—Pillsbury Winthrop LLP

(57) ABSTRACT

A zoom lens system comprising a first positive lens unit, a second negative lens unit, a third positive lens unit and a fourth positive lens unit, and configured to change a magnification by moving the first lens unit toward the object side, moving the second lens unit so as to widen an airspace between the first lens unit and the second lens unit, moving the third lens unit so as to narrow an airspace between the second lens unit and the third lens unit. This zoom lens system has a vari-focal ratio of 4.5 or higher, a compact design, a small number of lens elements, a field angle of 65° or larger and high performance over an entire vari-focal range.

29 Claims, 15 Drawing Sheets

ZOOM LENS SYSTEM

BACKGROUND OF THE INVENTION a) Field of the Invention

The present invention relates to a compact zoom lens system which has a high vari-focal ratio and a wide field angle.

b) Description of the Prior Art

To obtain a zoom lens system which is compact and has a high vari-focal ratio, it is effective to compose a lens system, in order from the object side, of a first positive lens unit, a second negative lens unit, a third positive lens unit and a fourth positive lens unit and configure the lens system so as to change a magnification by moving each lens unit.

As conventional examples of a zoom lens system which has such a composition, there are known lens system disclosed by first through sixth embodiments of Japanese Patent Kokai Publication No. Sho 57-168209, first through fourth embodiments of Japanese Patent Kokai Publication No. Sho 63-66522, first through eleventh embodiments of Japanese Patent Kokai Publication No. Sho 63-294506, first through third embodiments of Japanese Patent Kokai Publication No. Hei 1-229217, first through third embodiments of Japanese Patent Kokai Publication No. Hei 2-153311, first through fourth embodiments of Japanese Patent Kokai Publication No. Hei 9-101459, first embodiment of Japanese Patent Kokai Publication No. 9-101458, second and fourth embodiments of Japanese Patent Kokai Publication No. Hei 6-75167, first, second and fourth embodiments of Japanese Patent Kokai Publication No. Hei 8-220439, and first and second embodiments of Japanese Patent Kokai Publication No. Hei 8-248319.

The zoom lens systems mentioned above have vari-focal ratios which are not so high though each of the zoom lens system uses consists of a small number of lens elements on the order of 12 to 13.

Furthermore, each of zoom lens systems disclosed by third through sixth embodiments of Japanese Patent Kokai Publication No. Hei 8-248319 which are other conventional examples consists of lens elements in a number on the order of 12 to 13 and has a high vari-focal ration exceeding 4.5, but allows spherical aberration and astigmatism to be varied remarkably by changing a magnification from a wide position to a tele position.

SUMMARY OF THE INVENTION

An object of the present invention is to provide a zoom lens system comprising, in order from an object side: a first lens unit having positive refractive power; a second lens unit having negative refractive power; and a third lens unit having positive refractive power; and a fourth lens unit having positive refractive power, wherein a magnification is changed from a wide position to a tele position by moving the first lens unit toward the object side, moving the second lens unit so as to widen an airspace between the first lens unit and the second lens unit, moving the third lens unit so as to reduce an airspace between the second lens unit and the third lens unit and moving the fourth lens unit so as to reserve an airspace between the third lens unit and the fourth lens unit at the tele position which is narrower than that at the wide position, wherein an aperture stop is disposed on an image side of the second lens unit and on the object side of the fourth lens unit, wherein the fourth lens unit comprises a front subunit having positive refractive power and a rear subunit having negative refractive power, and wherein the zoom lens system satisfies the following conditions (1), (2) and (3):

$$4.1 < f_1/|f_2| < 5.0 \quad (1)$$

$$0.07 < |f_2|/f_T < 0.16 \quad (2)$$

$$0.1 < D_4/h < 0.7 \quad (3)$$

Another object of the present invention is to provide a zoom lens system comprising, in order from an object side: a first lens unit having positive refractive power; a second lens unit having negative refractive power; a third lens unit having positive refractive power; and a fourth lens unit having positive refractive power, wherein a magnification is changed from a wide position to a tele position by moving the first lens unit toward the object side, moving the second lens unit so as to widen an airspace between the first lens unit and the second lens unit, moving the third lens unit so as to reduce an airspace between the second lens unit and the third lens unit and moving the fourth lens unit so as to reserve an airspace between the third lens unit and the fourth lens unit which is narrower at the tele position that at the wide position, wherein the first lens unit consists, in order from the object side, of a negative lens element, a positive lens element and a positive meniscus lens element having a convex surface on the object side, wherein the second lens unit consists, in order from the object side, of a negative lens component, a negative lens component, a positive lens component and a negative lens component which are disposed with an airspace reserved between each pair of these lens components, wherein the third lens unit consists, in order from the object side, of a subunit having positive refractive power and a subunit having negative refractive power disposed with an airspace reserve between these subunits, wherein the fourth lens unit comprises a front subunit having positive refractive power and a rear subunit having negative refractive power, and wherein the zoom lens system satisfies the following conditions (1), (3) and (4):

$$4.1 < f_1/|f_2| < 5.0 \quad (1)$$

$$0.1 < D_4/h < 0.7 \quad (3)$$

$$0.2 < f_3/f_4 < 1.1 \quad (4)$$

DETAILED DESCRIPTION OF THE PREFERRED EMBODIMENTS

Figure 1:
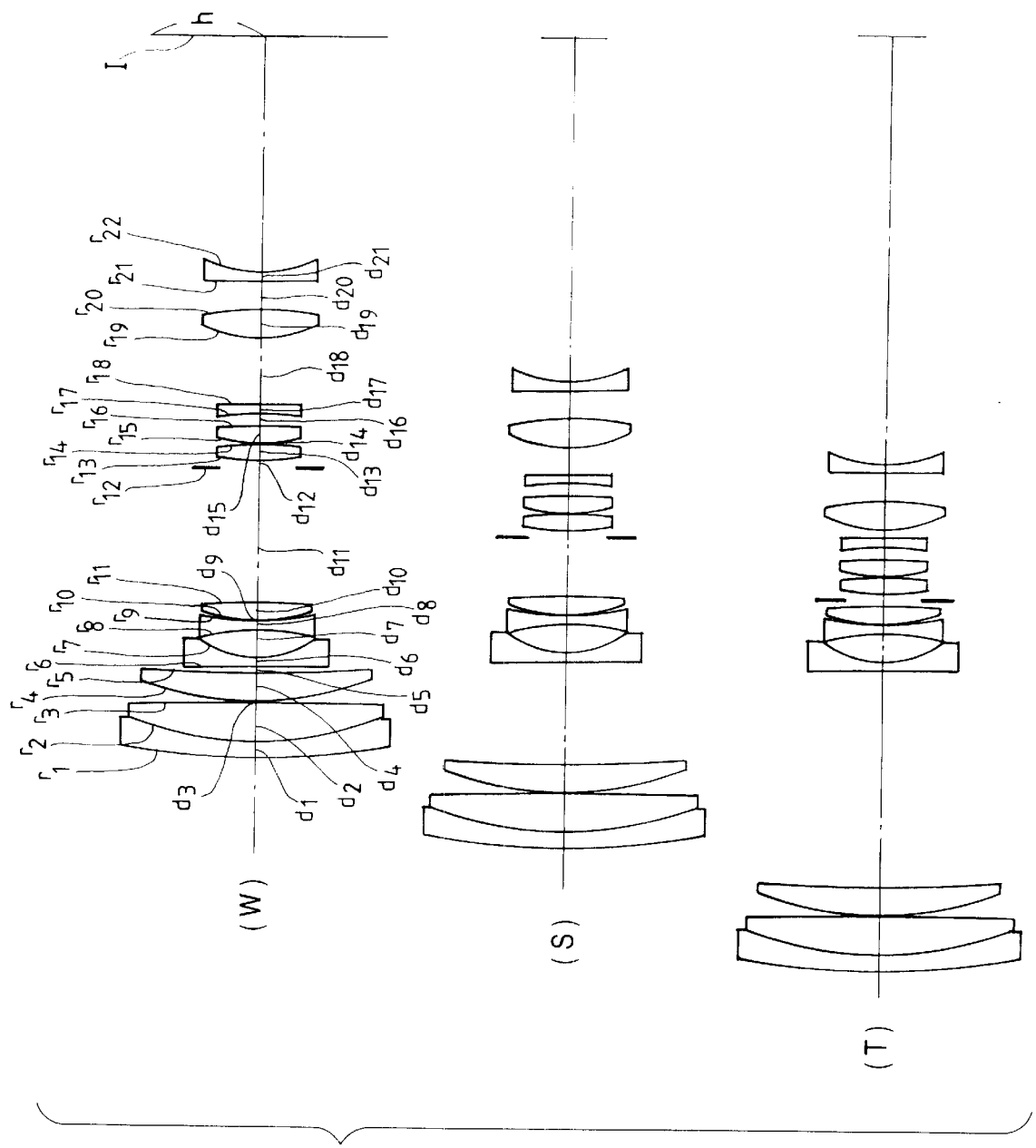
FIGS. 1 through 12 are sectional views illustrating compositions of first through twelfth embodiments of the present invention.
Figure 2:
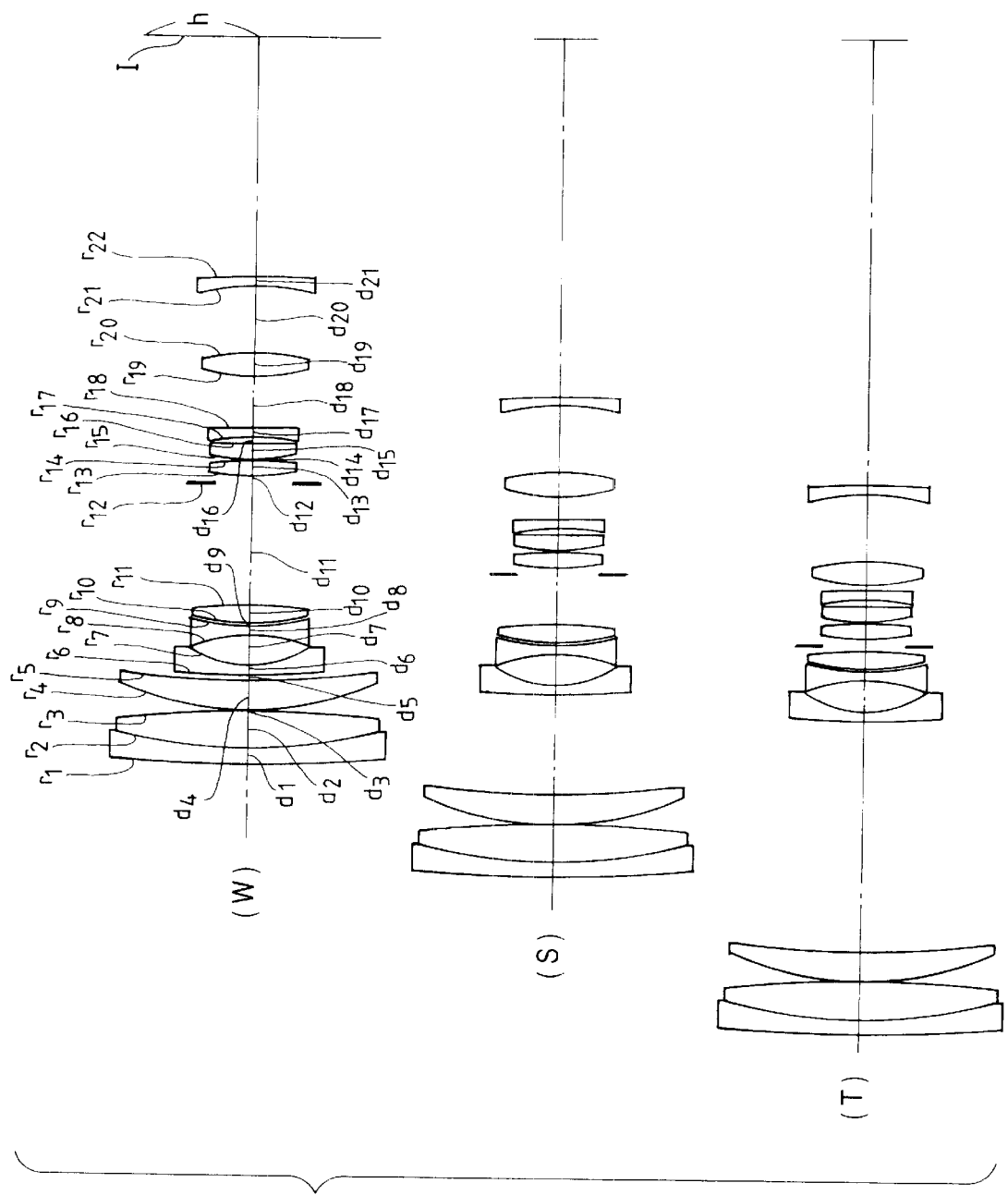
Figure 3:
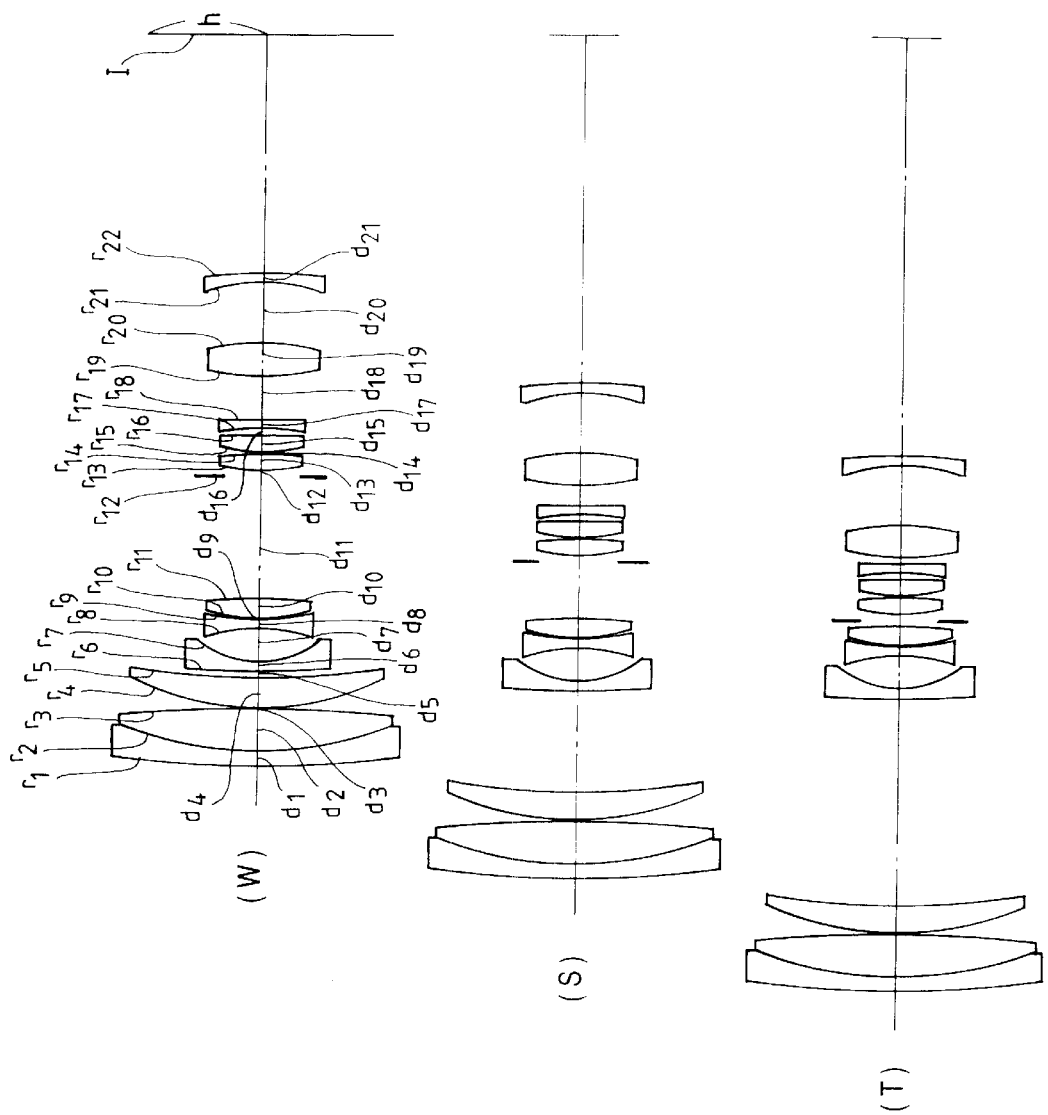
Figure 4:
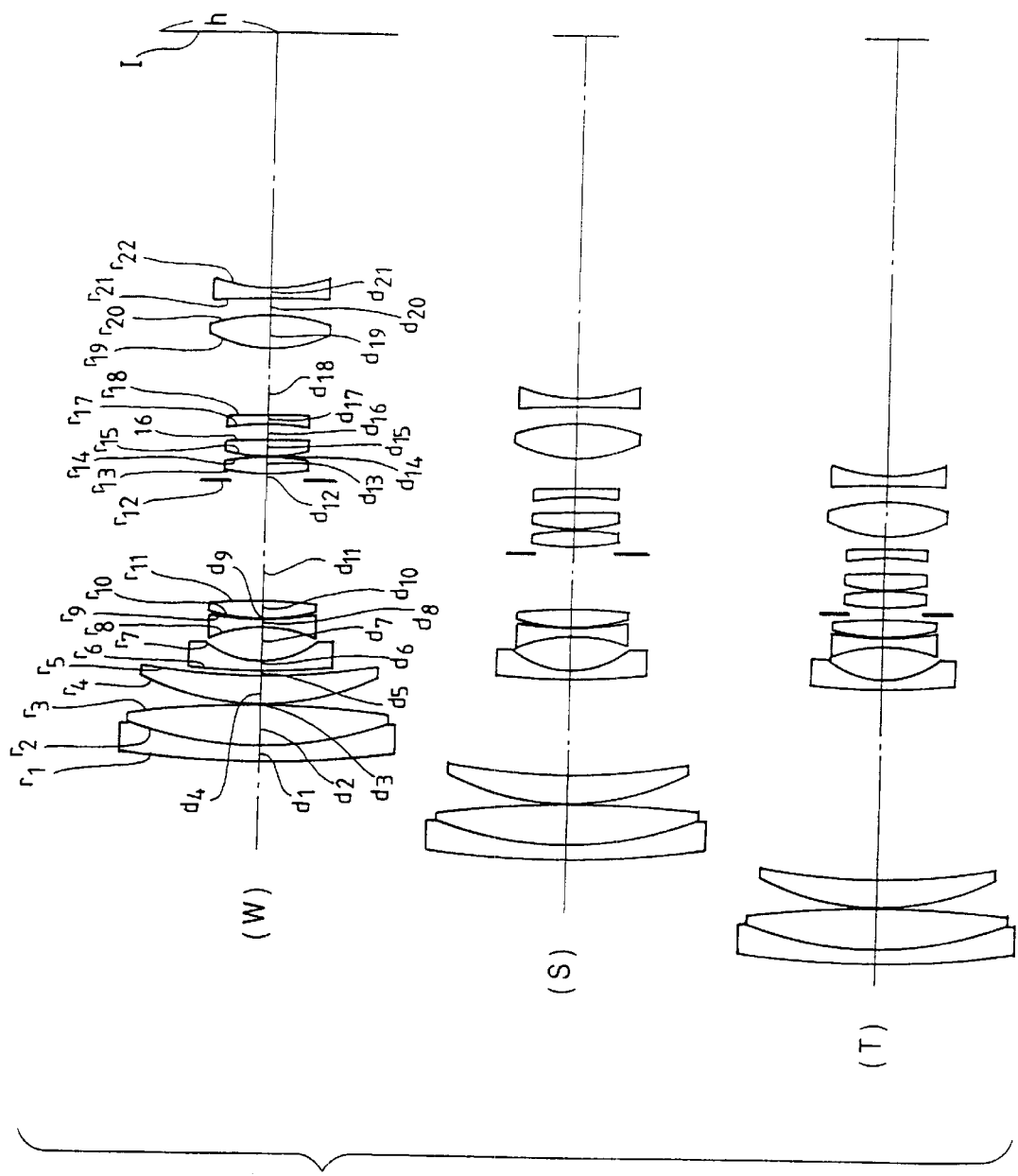
Figure 5:
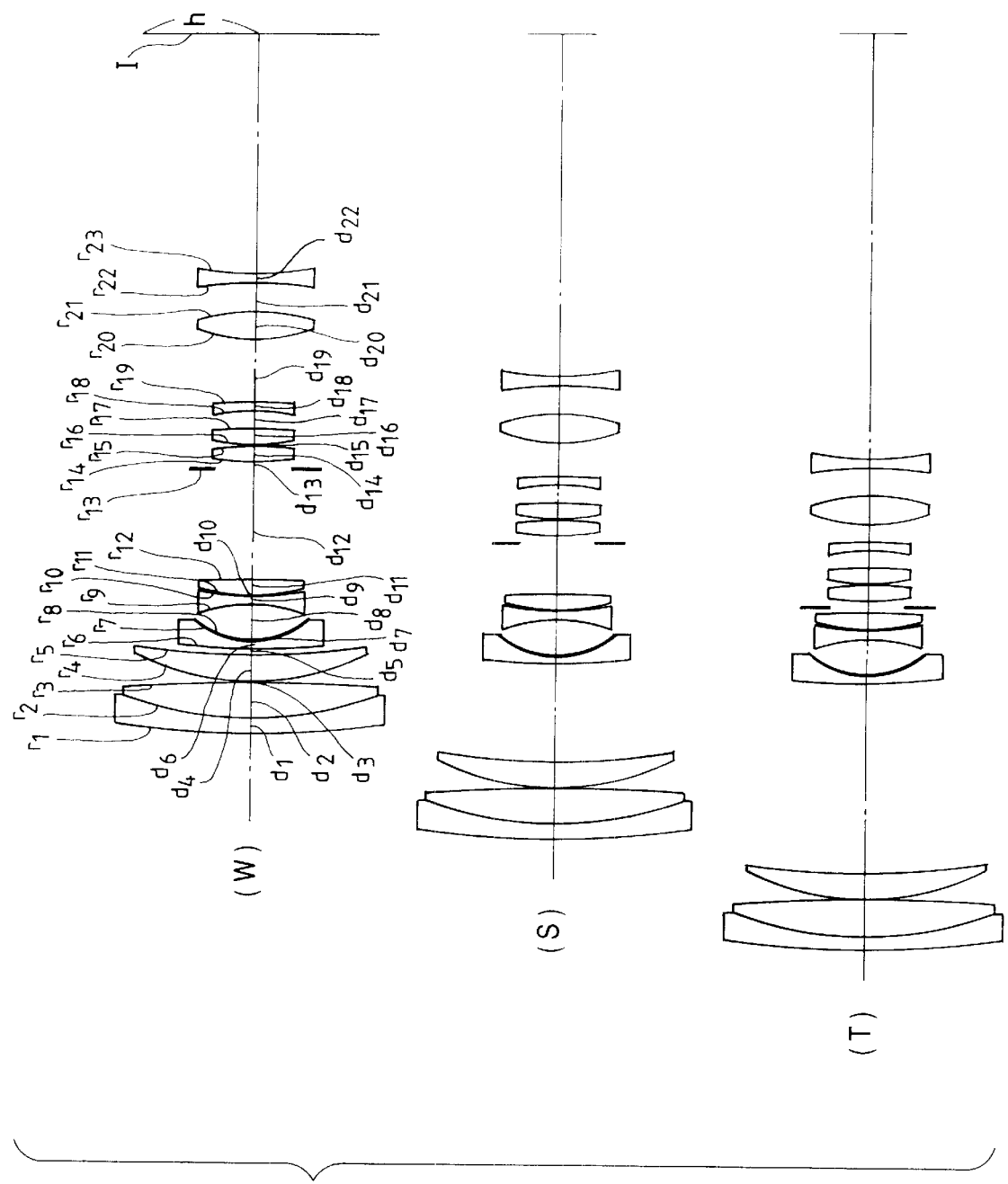
Figure 6:
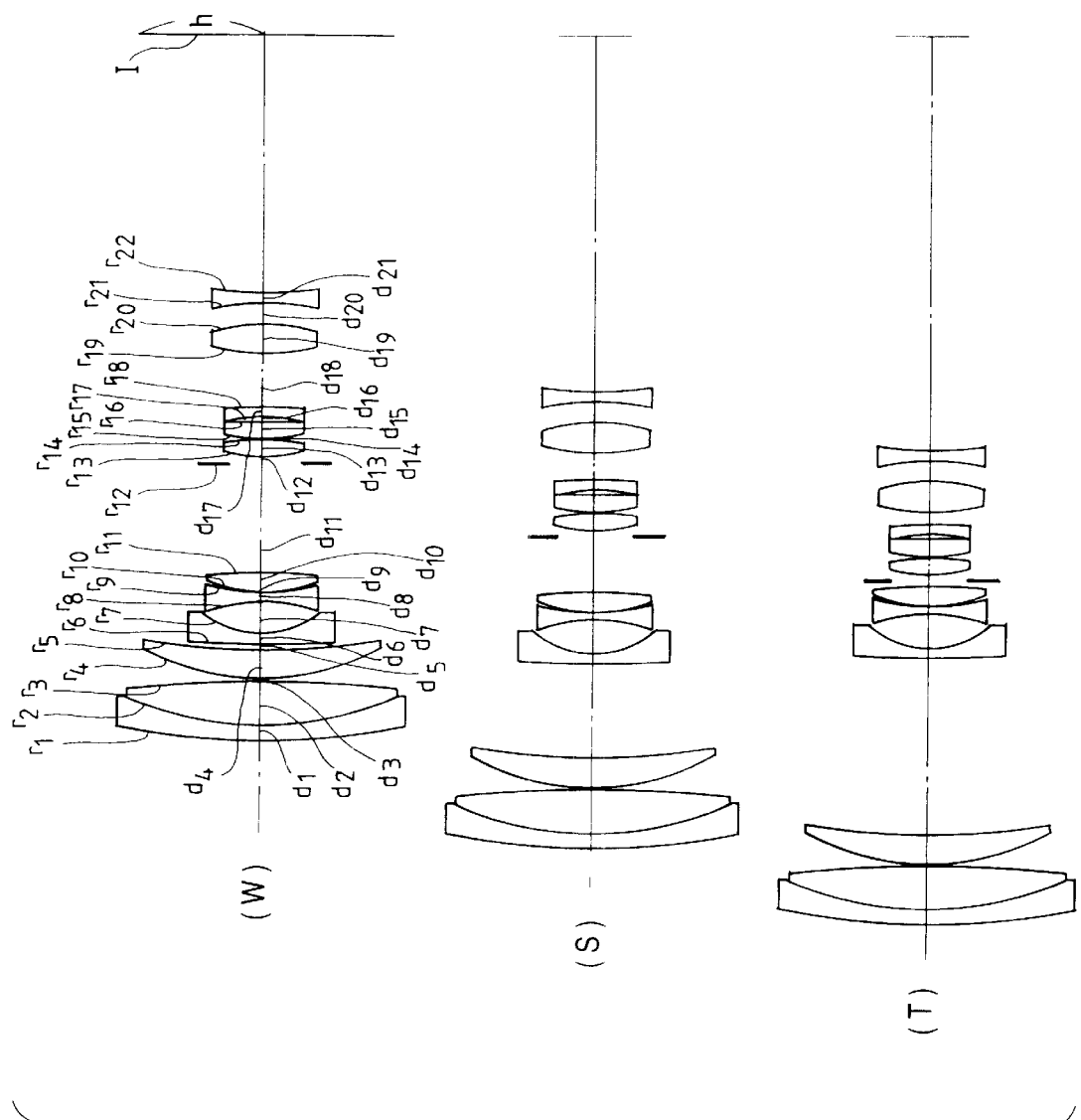
Figure 7:
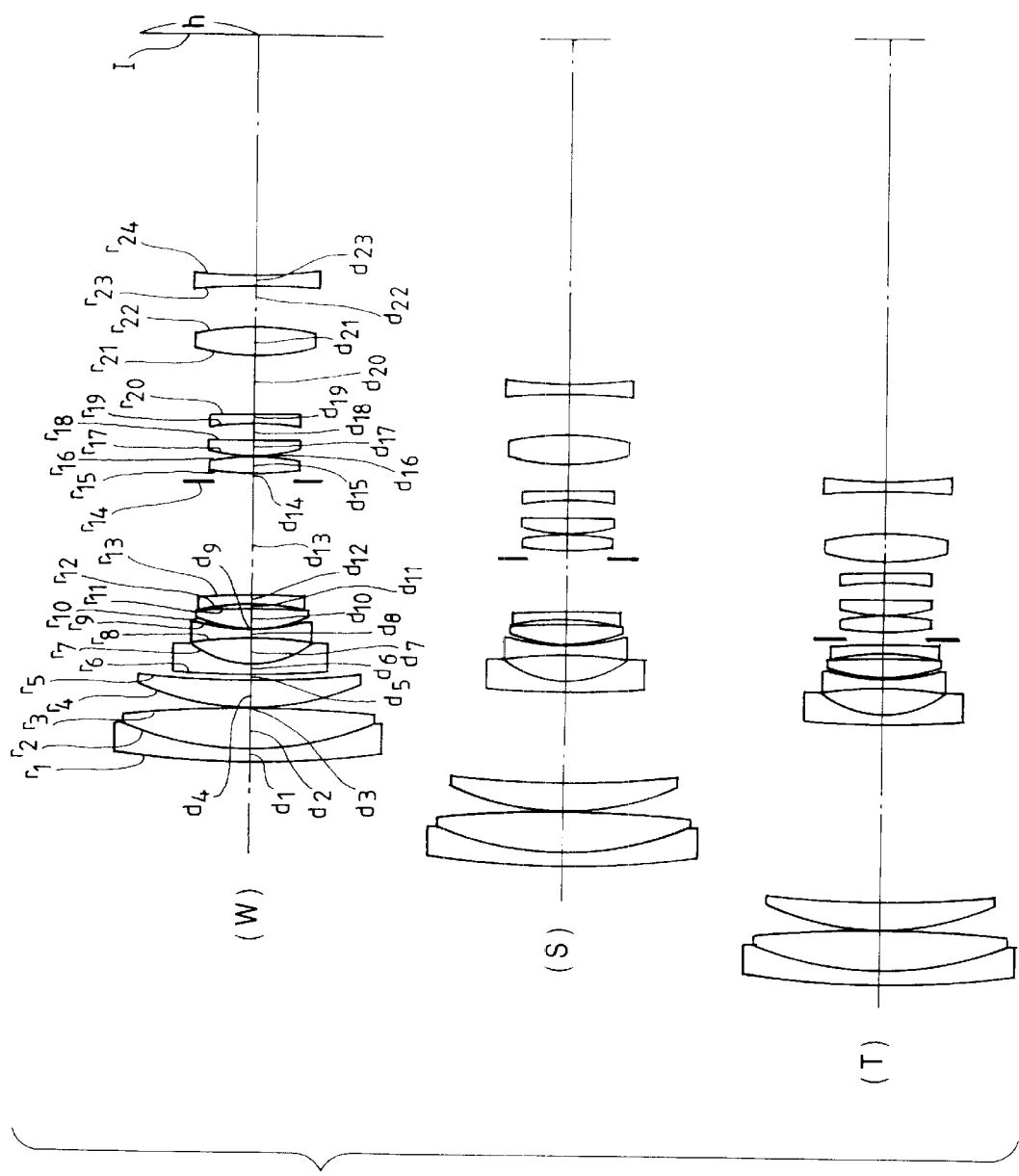
Figure 8:
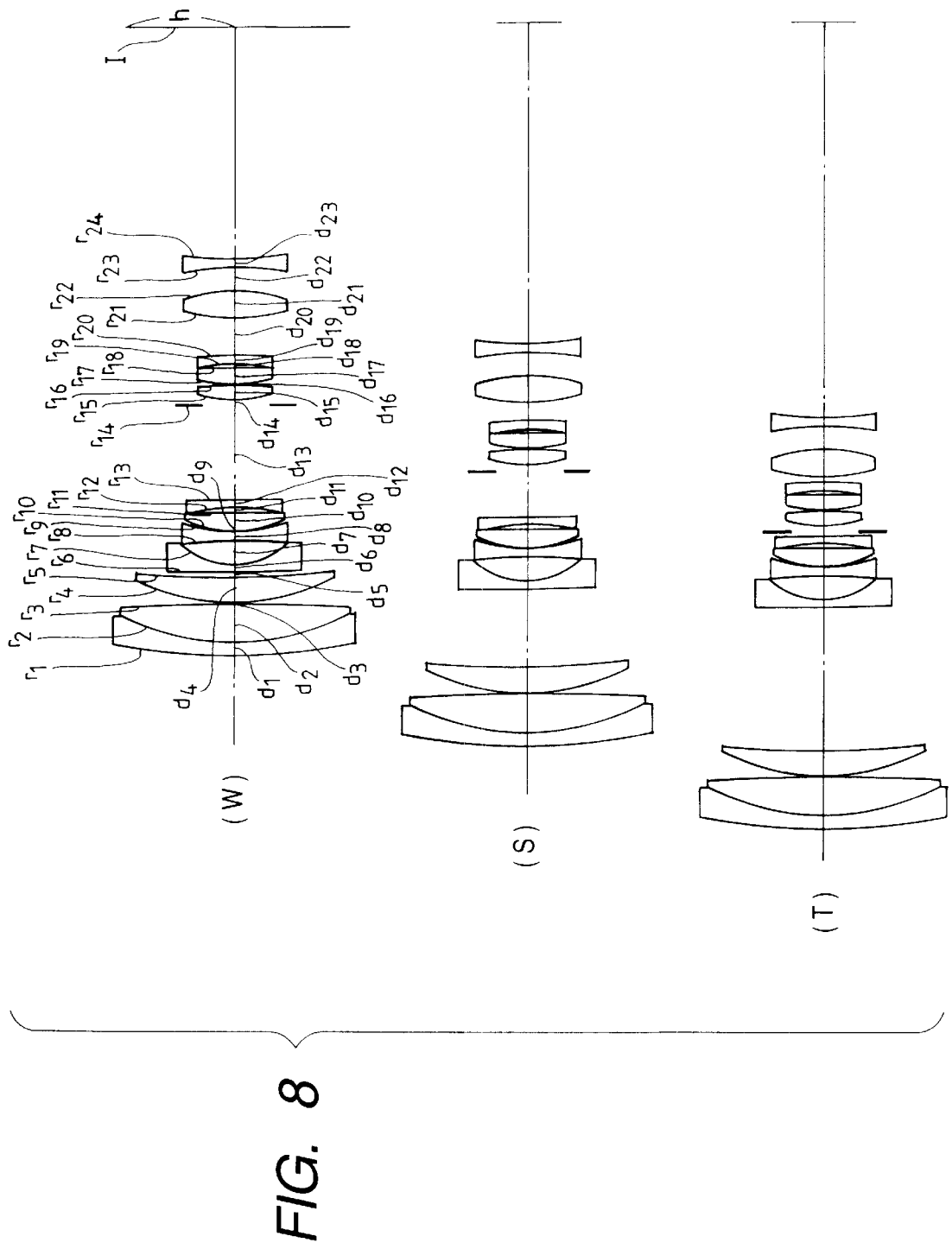
Figure 9:
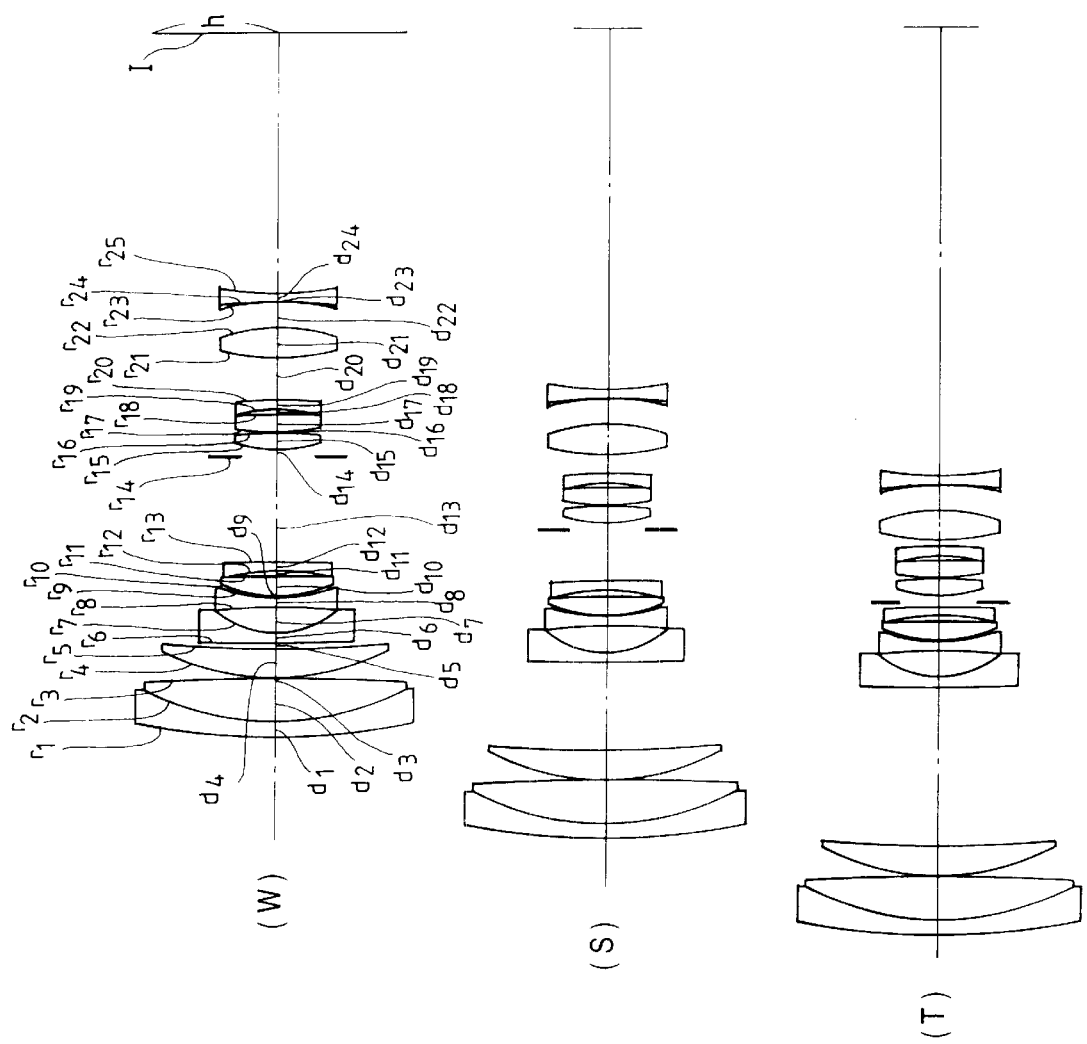
Figure 10:
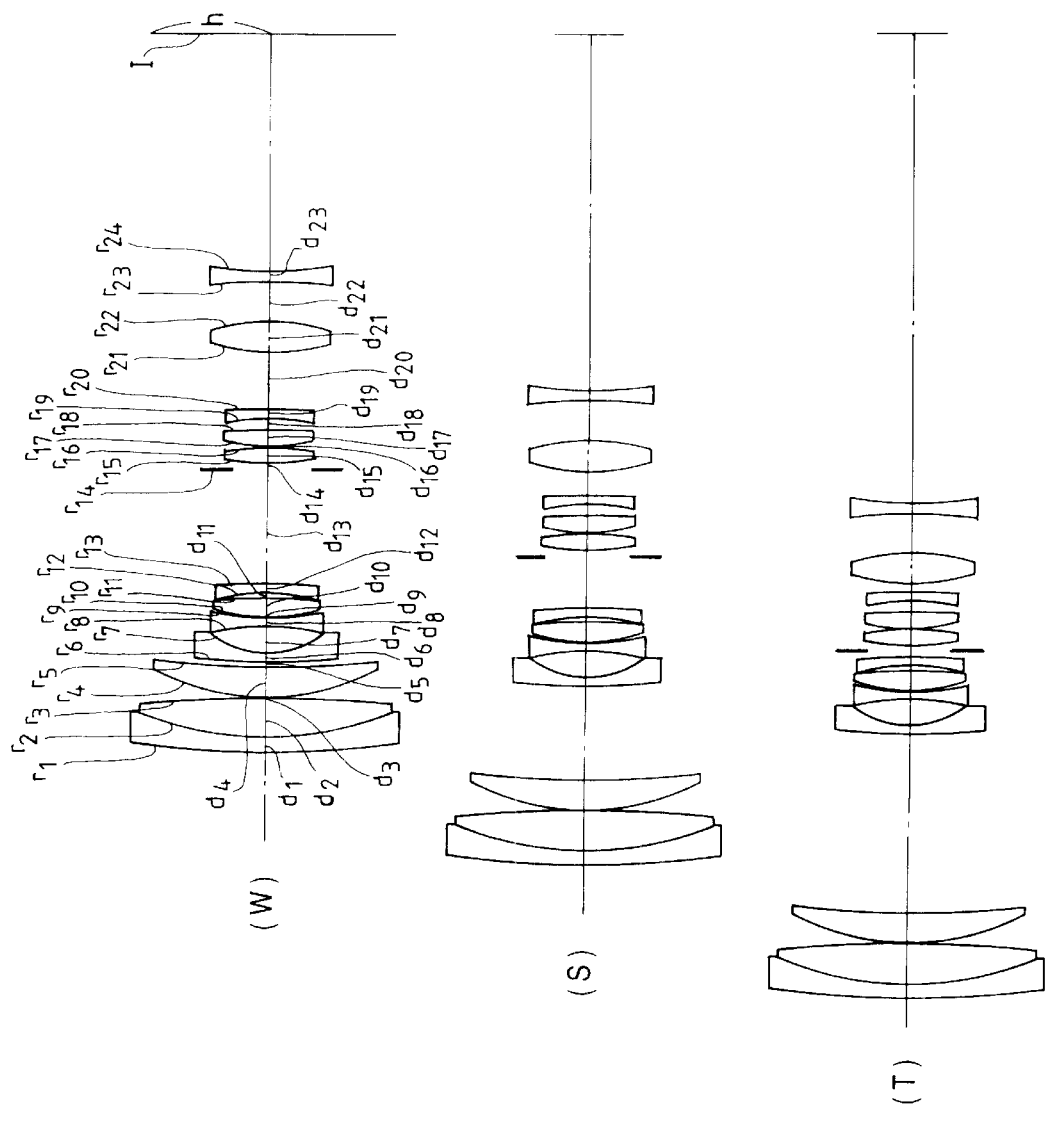
Figure 11:
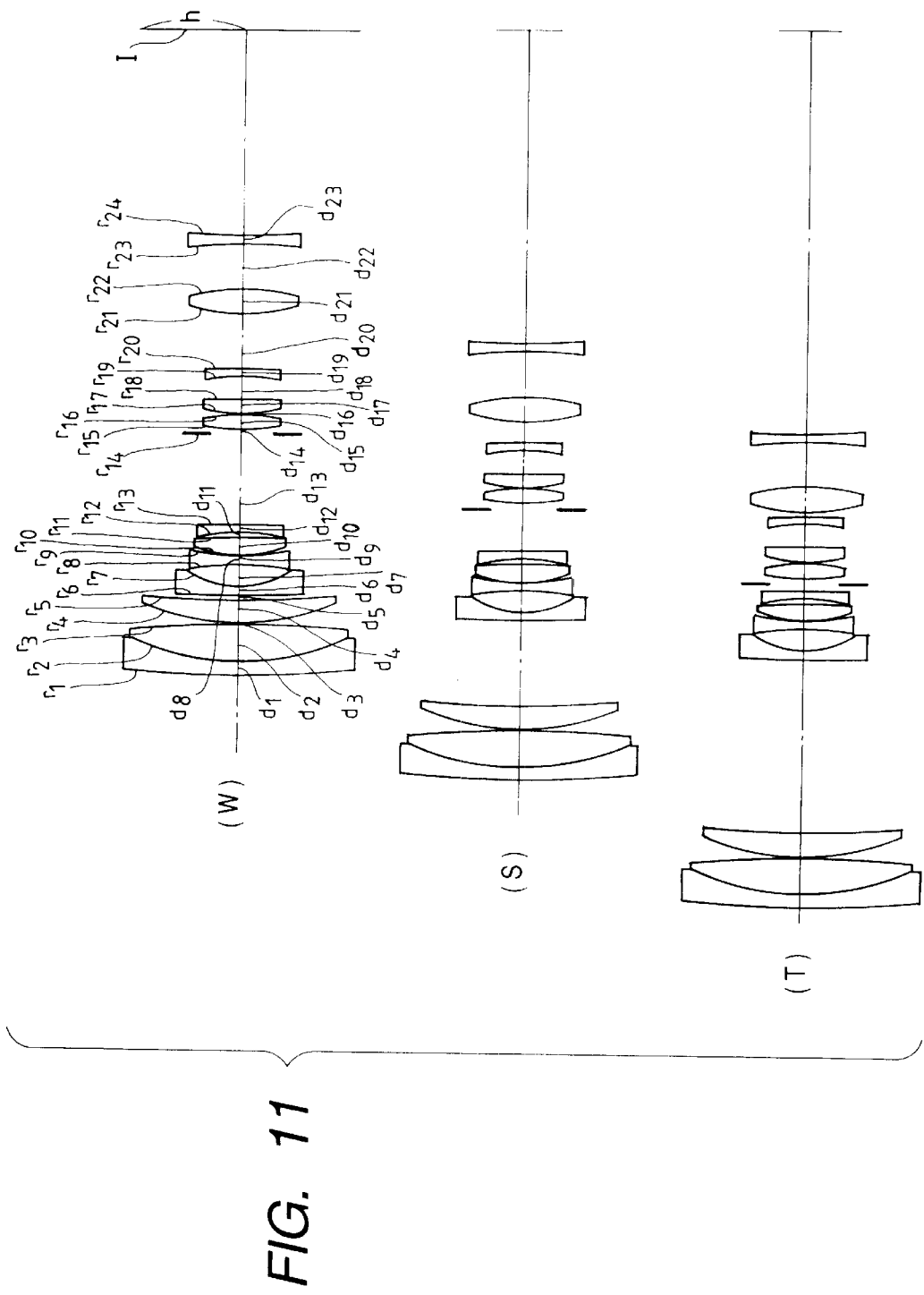
Figure 12:
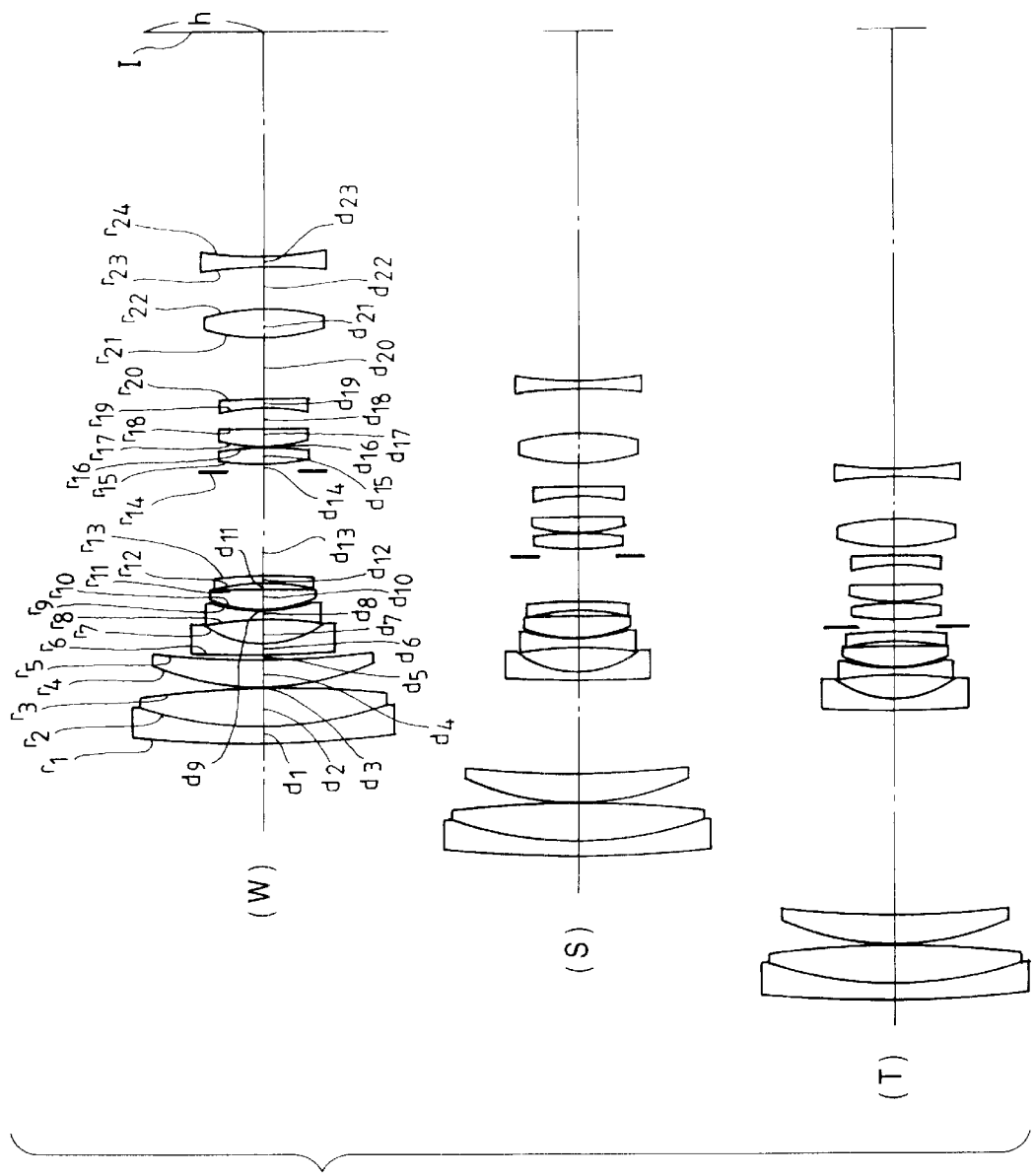

A zoom lens system according to the present invention which has a first composition comprises, in order from an object side, a first positive lens unit, a second negative lens unit, a third positive lens unit and a fourth positive lens unit, and is characterized in that a magnification is changed from a wide position to a tele position by moving the first lens unit toward the object side, moving the second lens unit so as to widen an airspace between the first lens unit and the second lens unit, moving the third lens unit so as to narrow an airspace between the second lens unit and the third lens unit and moving the fourth lens unit so as to reserve an airspace between the third lens unit and the fourth lens unit which is narrower at the tele position than that at the wide position, that an aperture stop is disposed on an image side of the second lens unit and on the object side of the fourth lens unit, and the fourth lens unit comprises a front subunit having positive refractive power and a rear subunit having negative refractive power, and that the zoom lens system satisfies the following conditions (1), (2) and (3);

$$4.1 < f_1/|f_2| < 5.0 \qquad (1)$$

$$0.07 < |f_2|/f_T < 0.16 \qquad (2)$$

$$0.1 < D_4/h < 0.7 \qquad (3)$$

wherein reference symbols $f_1$ and $f_2$ represent focal lengths of the first lens unit and the second lens unit respectively, a reference symbol $f_T$ designates a focal length of the zoom lens system as a whole at the tele position, a reference symbol $D_4$ denotes an airspace between a front subunit and a rear subunit of the fourth lens unit, and a reference symbol h represents a maximum height of an image to be photographed.

It is difficult for a zoom lens system which has a wide field angle to maintain favorable performance since an image surface and lateral chromatic aberration are largely varied not only at a wide position and a tele position but also in an intermediate focal length region as a vari-focal ratio is enhanced from a wide field angle.

In order to configure a zoom lens system so as to have a high vari-focal ratio, it is therefore important to select a movement and power appropriately for each lens unit.

The zoom lens system according to the present invention comprises the lens units which are arranged so as to have a positive, negative, positive, positive power distribution, and changes the magnification from the wide position to the tele position by moving the first lens unit toward the object side, moving the second lens unit so as to wide the airspace between the first lens unit and the second lens unit, moving the third lens unit so as to narrow the airspace between the airspace between the second lens unit and the third lens unit, and moving the fourth lens unit so as to reserve the airspace at the tele position which is narrower than that at the wide position as described above.

Accordingly, the zoom lens system according to the present invention is capable of favorably correcting offaxial aberrations which are produced mainly on a side of the wide position by the positive refractive power of the first lens unit and the negative refractive power of the second lens unit.

On a side of the tele position, the zoom lens system according to the present invention as a whole is capable of maintaining a short total length owing to the positive refractive power of the first lens unit, and favorably correcting mainly spherical aberration and coma by bringing the negative refractive power of the second lens unit close to the positive refractive power of the third lens unit and the fourth lens unit.

Furthermore, the spherical aberration and coma can be corrected more favorably by moving the third lens unit and the fourth lens unit toward the object side to change the magnification from the wide position to the tele position.

For reasons described above, the power and movements of the lens units are selected as described above, and the zoom lens system according to the present invention is further characterized by satisfying the above-mentioned conditions (1), (2) and (3).

The condition (1) is required for enabling to move each lens unit as required for obtaining a compact zoom lens system which has a high vari-focal ratio while maintaining favorable performance of the zoom lens system in the intermediate focal length region and distribute power appropriately.

If a lower limit of 4.1 of the condition (1) is exceeded, it is possible to configure the zoom lens system so as to have a short total length in the vicinities of the tele position, but the first lens unit will have a large diameter, thereby making it impossible to configure the zoom lens system so as to be compact and have a high vari-focal ratio. If an upper limit of 5.0 of the condition (1) is exceeded, in contrast, the second lens unit will have strong power, thereby allowing a front lens element to have a small diameter, but making it difficult to compress variations of aberrations within a zoom range including the intermediate focal length region.

The condition (2) is adopted to shorten a total length and obtain a high vari-focal ration at the tele position while maintaining favorable performance of the zoom lens system, and if a lower limit of 0.7 of the condition (2) is exceeded, an advantage will be obtained to shorten a total length and obtain a high vari-focal ratio at the tele position, but the second lens unit will have strong power, thereby making it difficult to correct aberrations which are produced by the second lens unit. If an upper limit of 0.16 of the condition (2) is exceeded, in contrast, it will be difficult to obtain a high vari-focal ratio while maintaining a short total length of the zoom lens system.

The condition (3) is adopted to reduce a diameter of the fourth lens unit by straining rays emerging from the front subunit of the fourth lens unit from diverging and obtain favorable optical performance of the zoom lens system over an entire vari-focal range.

If an upper limit of 0.7 of the condition (3) is exceeded, it will be possible to suppress variations of offaxial aberrations such as distortion, astigmatism and coma, but a diameter of the fourth lens unit and a total length of the zoom lens system as a whole will be prolonged, thereby making it impossible to configure the zoom lens system compact.

If a lower limit of 0.1 of the condition (3) is exceeded, in contrast, spherical aberration will be corrected favorably, and an outside diameter of the fourth lens unit and a total length of the zoom lens system as a whole can be shortened, but the offaxial aberrations will be varied remarkably over the entire vari-focal region.

When the zoom lens system is configured so as to have a vari-focal ratio which is high in particular and a broad vari-focal range, the offaxial aberrations are varied extremely remarkably. When a vari-focal ratio exceeds 4.5 and the lower limit of the condition (3) is exceeded, for example, distortion which has a negative value is produced at the wide position and distortion which has a positive value is produced at the tele position in a condition where other aberrations are corrected favorably. In other words, distortion is varied from the negative value to the positive value when a magnification is changed from the wide position to the tele position.

It is desirable for the zoom lens system which has the above described first composition to satisfy, in place of the conditions (1) and (3), the following conditions (1-1) and (3-1):

$$4.1 < f_1/|f_2| < 5.3 \qquad (1\text{-}1)$$

$$0.15 < D_4/h < 0.7 \qquad (3\text{-}1)$$

When the above-mentioned conditions which are more advantageous to obtain effects described with reference to the conditions (1) and (3) are satisfied, it is possible to obtain a zoom lens system which has more excellent optical performance.

A zoom lens system according to the present invention which has a second composition comprises, in order from an object side, a first lens unit having positive refractive power, a second lens unit having negative refractive power, a third lens unit having positive refractive power and a fourth lens unit having positive refractive power, and is characterized in that a magnification is chanted from a wide position to a tele position by moving the first lens unit toward the object side, moving the second lens unit so as to widen an airspace between the first lens unit and the second lens unit, moving the third lens unit so as to reduce an airspace between the second lens unit and the third lens unit and moving the fourth lens unit so as to reserve an airspace between the third lens unit and the fourth lens unit which is narrower at the tele position than that at the wide position, and that the first unit consists, in order from the object side, of a negative lens element, a positive lens element and a positive meniscus lens element having a convex surface on the object side, the second lens unit consists, in order from the object side, of a negative lens component, a negative lens component, a positive lens component and a negative lens component disposed with an airspace reserved between each pair of the lens components, the third lens unit consists, in order from the object side, of a subunit having positive refractive power and a negative subunit disposed with an airspace reserved therebetween, the fourth lens unit consists of a front subunit having positive refractive power and a rear subunit having negative refractive power, and that the zoom lens system satisfies the following conditions (1), (3) and (4);

$$4.1 < f_1/|f_2| < 5.0 \quad (1)$$

$$0.1 < D_4/h < 0.7 \quad (3)$$

$$0.2 < f_3/f_4 < 1.1 \quad (4)$$

wherein reference symbols $f_3$ and $f_4$ represent focal lengths of the third lens unit and the fourth lens unit respectively.

For a reason which is the same as that for the zoom lens system according to the present invention which has the first composition, the zoom lens system according to the present invention which has the second composition comprises a first positive lens unit, a second negative lens unit, a third positive lens unit and a fourth positive lens unit, and is configured to change a magnification from the wide position to the tele position by moving the first positive lens unit toward the object side, moving the second negative lens unit so as to widen an airspace between the first lens unit and the second lens unit, moving the third lens unit so as to reduce an airspace between the second lens unit and the third lens unit and moving the fourth lens unit so as to reserve an airspace between the third lens unit and the fourth lens unit which is narrower at the tele position than that at the wide position.

Furthermore, the zoom lens system which has the second composition is configured to correct lateral chromatic aberration more favorably and suppress variations of the offaxial aberrations such as distortion and astigmatism by composing the first lens unit, in order from the object side, of the negative lens element, the positive lens element and the positive meniscus lens element having the convex surface on the object side.

That is, the negative lens element and the positive lens element are disposed on the object side in the first lens unit to correct lateral chromatic aberration favorably. In this case, it is effective to dispose the above described negative lens element and positive lens element close to each other.

Furthermore, variations of the offaxial aberrations mainly of distortion and astigmatism which are produced by the second lens unit can be suppressed by disposing, on the image side of these negative lens element and positive lens element, the positive meniscus lens element which has the convex surface on the object side.

In the zoom lens system which has the second composition, the second lens unit consists, in order from the object side, of the negative lens component, the negative lens component, the positive lens component and negative lens component so that a vari-focal ratio of the zoom lens system can be enhanced by strengthening power of the second lens unit while maintaining favorably optical performance by suppressing aggravation of distortion at the wide position and preventing an image surface and lateral chromatic aberration from being varied by changing the magnification. That is, positive distortion produced by the first lens unit can be corrected by configuring a lens unit disposed on the most object side in the second lens unit as a lens component having strong negative power, but it is not preferable that this negative lens component has too strong power since it allows mainly coma and lateral chromatic aberration to be remarkably varied by changing the magnification. Variations of the above described aberrations can be suppressed by sharing the power of the negative lens element disposed on the most object side between the two negative lens components.

Furthermore, mainly longitudinal chromatic aberration produced by the two negative lens components on the object side in the second lens unit and spherical aberration on a side of the tele position are corrected by the positive lens component disposed on an image side of these negative lens components.

Furthermore, this positive lens component also serves for correcting spherical aberration and coma with good balance remaining after the negative lens component which is disposed on the image side successively to the positive lens component.

For correction of the above described aberrations and the like, it is effective to disposed the four lens components independently with an airspace reserved between the each pair of the lens components. Though these lens components are not limited to single-element lens components, the above described aberration correcting functions and so on can be obtained even when all the lens components are configured as single-element lens components to configure the zoom lens system as a light-weight and compact lens system which consists of a small number of lens elements and can be manufactured at a low cost.

Furthermore, the zoom lens system having the second composition is configured so as to satisfy the conditions (1) and (3) for a reason similar to that described with reference to the first composition.

Furthermore, the zoom lens system which has the second composition is configured to satisfy the condition (4) for a reason described below.

The condition (4) is adopted to reduce a diameter of the zoom lens system and maintain favorable aberrations.

If a lower limit of 0.2 of the condition (4) is exceeded, a function to correct mainly spherical aberration in the vicinities of the tele position will be concentrated on the third lens unit, thereby making it impossible to obtain favorable performance of the zoom lens system. If an upper limit of 1.1 of the condition (4) is exceeded, in contrast, the fourth lens unit will have too strong power and a large diameter which are not preferable for compact design of a camera.

The zoom lens system according to the present invention which have the first composition and the second composition are compact, and have high vari-focal ratios and favorable optical performance as described above, the vari-focal ratios being 4.5 or higher as described later in embodiments.

For the zoom lens system according to the present invention which has the first or second composition, it is desirable to dispose a positive subunit on the most object side in the third lens unit. That is, it is desirable that the third lens unit comprises a positive subunit disposed on the most object side in the zoom lens system which has the first composition or the third lens unit comprises a positive subunit on the most object side in the zoom lens system which has the second composition.

For the zoom lens system according to the present invention which has the first composition or the second composition, it is desirable that the third lens unit comprises a negative component which is disposed on the most image side and in contact with air on the object side (an airspace is reserved on the object side of the negative lens component). That is, it is desirable for the zoom lens system which has the first composition that the third lens unit comprises, on the most image side, a negative lens component which is in contact with air on the object side. Furthermore, it is desirable for the zoom lens system which has the second composition that the third lens unit comprises, on the most object side, a positive lens component consisting of a positive lens element as described above.

For the zoom lens system according to the present invention which has the first or second composition, it is desirable that the third lens unit consists of a positive lens component, a positive lens component and a negative lens component having a concave surface on the object side. That is, it is desirable for the zoom lens system which has the first composition that the third lens unit consists of a positive lens component, a positive lens component and a negative lens component having a concave surface on the object side. Furthermore, it is desirable for the zoom lens system which has the second composition that the third lens unit consists of a subunit consisting of a positive lens component and a positive lens component, and a negative lens component having a concave surface on the object side.

Furthermore, it is desirable for the zoom lens system which has the first or second composition that the lens component disposed on the most object side in the third lens component is a positive lens element.

Furthermore, it is desirable for the zoom lens system which has the first or the second composition that the lens component which is disposed on the most image side is a negative lens element.

Furthermore, it is desirable for the zoom lens system which has the first or the second composition that the third lens unit comprises a negative lens component disposed on the most image side and a positive lens component which is disposed before the negative lens component with an airspace interposed, and that curvature on an image side surface of the positive lens component which is disposed on the object side of the negative lens component is lower than that on an object side surface of the negative lens element disposed on the most image side.

The zoom lens system according to the present invention can be more compact and have a high vari-focal ratio by strengthening vari-focal functions of the second lens unit and the third lens unit. A principal point can be brought nearer the second lens unit and the vari-focal functions can be strengthened by disposing the positive subunit on the most object side in the third lens unit as described above and disposing a negative lens component on the most image side with an airspace reserved between the positive subunit and this negative lens component.

In the zoom lens system which has the first or the second composition, the fourth lens unit can be composed of a small number of lens components and configured compact when the front subunit of the fourth lens unit is composed of a positive lens component and the rear subunit of the fourth lens unit which is disposed with the airspace reserved between the front subunit and the rear subunit is composed of a negative lens component.

Furthermore, it is desirable that the rear subunit comprises an aspherical surface which has such a shape as to strengthen negative refractive power toward marginal portions of the aspherical surface. When such an aspherical is disposed, it is possible to compose each of the front subunit and the rear subunit of the fourth lens unit of a lens element, thereby shortening an axial length of the fourth lens unit and maintaining favorable optical performance even when the fourth lens unit is compact.

An aspherical lens element which is to be used in the fourth lens unit may be configured as a hybrid lens element which has resin disposed on a surface of a glass lens element.

It is preferable for the zoom lens system according to the present invention which has the first composition to compose the second lens unit of a negative lens component, a negative lens component and a positive lens component with an airspace reserved between each pair of the lens components.

A vari-focal ratio can be enhanced by varying the airspace between the second lens unit and the third lens unit so as to enhance the vari-focal functions and it is necessary for this purpose to strength the negative power of the second lens unit. However, such strengthening of the negative power of the second lens unit results in aggravation of distortion mainly at the wide position, and allows an image surface and lateral chromatic aberration to be varied by changing a magnification. The second lens unit therefore consists of the negative lens component, the negative lens component and the positive lens component which are independent respectively. This composition makes it possible to strengthen the negative power of the second lens unit, while maintaining the above mentioned aberrations favorably. that is, the above described composition makes it possible to strength the negative power of the second lens unit for obtaining a high vari-focal ratio and moreover maintain each of the above described aberrations favorably.

Furthermore, mainly distortion and coma can be corrected more favorably by forming an aspherical surface on the lens component disposed on the most object side in the second lens unit.

Furthermore, the first, second and third lens components of the second lens unit can consists of a negative lens element, a negative lens element and a positive lens element respectively, thereby making it possible to configure the zoom lens system so that it is light-weight, compact and can be manufactured at a low cost.

It is more desirable for the zoom lens system according to the present invention which has the first composition to compose the second lens unit of a negative lens component, a negative lens component and a positive lens component and a negative lens component with an airspace reserved between each pair of the lens components as in the second composition.

The second lens unit which consists of the negative, negative, positive and negative lens components can have strong negative power while maintaining favorably optical performance by suppressing the variation of distortion at the wide position and preventing an image surface and lateral chromatic aberration from being varied by changing a magnification, like the second lens unit which consists of the negative, negative and positive lens components.

By configuring the first lens component disposed on the most object side in the second lens unit as a negative lens component which has strong power, it is possible to effectively correct positive distortion produced by the first lens unit. When the first lens component has too strong negative power, however, mainly astigmatism, coma and lateral chromatic aberration are varied remarkably by changing a magnification. Variations of these aberrations can be reduced by sharing this negative power between the first lens unit and the second lens unit. Furthermore, longitudinal chromatic aberration produced by the second lens component as well as spherical aberration and coma on a side of the tele position can be corrected by the third positive lens component. Furthermore, residual chromatic aberration, spherical aberration and coma can be corrected with good balance by the fourth lens component successive to the third lens component.

It is desirable that the four first, second, third and fourth lens components are disposed independently with an airspace reserved between each pair of the lens components, thereby making it possible to maintain favorable aberrations.

Furthermore, each of the above described four lens component can be composed of a single lens element so that the zoom lens system consists of a small number of lens elements, is light-weight and compact, and can be manufactured at a low cost.

It is desirable that the zoom lens system which has the first composition and uses the second lens unit composed of the first negative lens component, the second negative lens component, the third positive lens component and the fourth negative lens component satisfies the following condition (5):

$$-0.07 \leq h/R_{2G} \leq 0.35 \tag{5}$$

wherein a reference symbol $R_{2G}$ represents a radius of curvature of a most object side surface of the second lens unit.

When a radius of curvature $R_{2G}$ on the most object side surface of the second lens unit is within a range defined by the above-mentioned condition (5), the second lens unit can have low curvature as a whole, thereby making it possible suppress production of aberrations and prevent aberrations from being varied by changing a magnification while strengthening power of the second lens unit as a whole. If an upper limit of 0.35 of the condition (5) is exceeded, it will be impossible to correct distortion produced by the first lens unit at the wide position. If a lower limit of $-0.07$ of the condition (5) is exceeded, the most object side surface of the second lens unit will produce remarkable distortion, thereby making it impossible to prevent distortion from being varied mainly by changing a magnification.

Furthermore, it is desirable for the zoom lens system which has the first composition to compose the first lens unit, in order from the object side, of a first negative lens element, a second positive lens element and a third positive meniscus lens element which has a convex surface on the object side.

In order to enhance a function of the first lens unit to correct lateral chromatic aberration in the zoom lens system according to the present invention, it is effective to dispose the first negative lens element and the second positive lens element close to each other in the first lens unit. Furthermore, when the positive meniscus lens element which has the convex surface on the object side is disposed on image side of the second lens element consisting of the positive lens element, it is possible to prevent offaxial aberration, mainly of distortion and astigmatism, from being varied by changing a magnification.

When the first lens element and the second lens element which are the negative lens element and the positive lens element of the first lens unit are cemented to each other so as to form a cemented lens component, it is possible to reduce ghost which is produced by rays which are high on the most object side and reflected a plurality of time between lens surfaces.

It is desirable that an airspace $D_2$ between the first lens element (negative lens element) and the second lens element (positive lens element) of the first lens unit satisfies the following condition (6):

$$0 \leq D_2/h \leq 0.035 \tag{6}$$

wherein a reference symbol h represents a maximum height of an image to be photographed.

If an upper limit 0.035 of the condition (6) is exceeded, astigmatism and distortion of high orders will be produced and remarkably varied undesirably by changing a magnification. There exists no value which exceeds a lower limit of the condition (6).

Furthermore, it is desirable that the zoom lens system according to the present invention which has the second composition satisfies the above-mentioned condition (2).

Furthermore, it is desirable that the zoom lens system according to the present invention which has the first or second composition satisfies, in place of the condition (3), the following condition (3-2):

$$0.14 < D_4/h < 0.5 \tag{3-2}$$

Furthermore, it is desirable that the zoom lens system according to the present invention which has the first or second composition satisfies, in place of the condition (1), the following condition (1-2):

$$4.3 < f_1/|f_2| < 4.9 \tag{1-2}$$

Furthermore, it is desirable that the zoom lens system according to the present invention which has the first composition satisfies the following condition (4):

$$0.2 < f_3/f_4 < 1.1 \tag{4}$$

wherein reference symbols $f_3$ and $f_4$ represent focal lengths of the third lens unit and the fourth lens unit respectively.

Numerical data of embodiments of the zoom lens system according to the present invention will be listed below;

Embodiment 1 f = 28.978~62.352~135.263, F number = 4.545~5.936~7.145,
2ω = 76.5°~36.9°~17.4°,
$r_1$ = 139.096
$d_1$ = 2.700          $n_3$ = 1.80518     $v_1$ = 25.42
$r_2$ = 59.508
$d_2$ = 6.650          $n_2$ = 1.48749     $v_2$ = 70.23

-continued

Embodiment 1

| | | | |
|---|---|---|---|
| $r_3 = -5528.039$ | | | |
| $d_3 = 0.200$ | | | |
| $r_4 = 53.461$ | | | |
| $d_4 = 5.000$ | $n_3 = 1.65844$ | | $\nu_3 = 50.88$ |
| $r_5 = 287.987$ | | | |
| $d_5 = D_1$ (variable) | | | |
| $r_6 = -2652.243$ | | | |
| $d_6 = 1.750$ | $n_4 = 1.77250$ | | $\nu_4 = 49.60$ |
| $r_7 = 17.393$ | | | |
| $d_7 = 4.811$ | | | |
| $r_8 = -40.390$ | | | |
| $d_8 = 1.600$ | $n_5 = 1.72916$ | | $\nu_5 = 54.68$ |
| $r_9 = 49.193$ | | | |
| $d_9 = 0.200$ | | | |
| $r_{10} = 32.862$ | | | |
| $d_{10} = 2.900$ | $n_6 = 1.80809$ | | $\nu_6 = 22.76$ |
| $r_{11} = -251.048$ | | | |
| $d_{11} = D_2$ (variable) | | | |
| $r_{12} = \infty$ (stop) | | | |
| $d_{12} = 1.000$ | | | |
| $r_{13} = 38.941$ | | | |
| $d_{13} = 2.800$ | $n_7 = 1.48749$ | | $\nu_7 = 70.23$ |
| $r_{14} = -93.001$ | | | |
| $d_{14} = 0.200$ | | | |
| $r_{15} = 30.801$ | | | |
| $d_{15} = 2.800$ | $n_8 = 1.48749$ | | $\nu_8 = 70.23$ |
| $r_{16} = -244.386$ | | | |
| $d_{16} = 2.150$ | | | |
| $r_{17} = -46.901$ | | | |
| $d_{17} = 1.540$ | $n_9 = 1.84666$ | | $\nu_8 = 23.78$ |
| $r_{18} = -8081.791$ | | | |
| $d_{18} = D_3$ (variable) | | | |
| $r_{19} = 22.664$ | | | |
| $d_{19} = 5.000$ | $n_{10} = 1.51633$ | | $\nu_{10} = 64.14$ |
| $r_{20} = -50.473$ | | | |
| $d_{20} = 4.658$ | | | |
| $r_{21} = 89.793$ (aspherical surface) | | | |
| $d_{21} = 1.700$ | $n_{11} = 1.75512$ | | $\nu_{11} = 45.60$ |
| $r_{22} = 24.412$ | | | | aspherical surface coefficients
(21st Surface)

$k=0.0000$, $A_4=-3.7818\times10^{-5}$, $A_6=-1.1667\times10^{-7}$
$A_8=4.0236\times10^{-10}$, $A_{10}=-1.6813\times10^{-12}$

| | | | |
|---|---|---|---|
| f | 28.978 | 62.352 | 135.263 |
| fB | 39.453 | 57.917 | 72.144 |
| $D_1$ | 0.899 | 17.786 | 37.727 |
| $D_2$ | 23.410 | 10.383 | 1.242 |
| $D_3$ | 11.197 | 4.680 | 1.324 |

$f_1/|f_2|=4.66$, $|f_2|/f_T=-0.15$, $D_4/h=0.22$ $f_3/f_4=0.80$, $h/R_{2G}=-0.008$, $D_2/h=0$

Embodiment 2 f = 28.962~62.333~135.278, F number = 4.349~5.888~7.169,
$2\omega$ = 76.6°~37.1°~17.5°,

| | | | |
|---|---|---|---|
| $r_1 = 258.674$ | | | |
| $d_1 = 2.700$ | $n_1 = 1.80518$ | | $\nu_1 = 25.42$ |
| $r_2 = 85.414$ | | | |
| $d_2 = 6.800$ | $n_2 = 1.48749$ | | $\nu_2 = 70.23$ |
| $r_3 = -202.153$ | | | |
| $d_3 = 0.250$ | | | |
| $r_4 = 56.462$ | | | |
| $d_4 = 4.800$ | $n_3 = 1.74100$ | | $\nu_3 = 52.64$ |
| $r_5 = 136.342$ | | | |
| $d_5 = D_1$ (variable) | | | |

-continued

Embodiment 2

| | | | |
|---|---|---|---|
| $r_6 = 137.910$ | | | |
| $d_6 = 1.750$ | $n_4 = 1.77250$ | | $\nu_4 = 49.60$ |
| $r_7 = 17.001$ | | | |
| $d_7 = 5.350$ | | | |
| $r_8 = -30.223$ | | | |
| $d_9 = 1.700$ | $n_5 = 1.72916$ | | $\nu_5 = 54.68$ |
| $r_9 = 38.674$ (aspherical surface) | | | |
| $d_9 = 0.350$ | | | |
| $r_{10} = 35.083$ | | | |
| $d_{10} = 3.250$ | $n_6 = 1.84666$ | | $\nu_6 = 23.78$ |
| $r_{11} = -92.849$ | | | |
| $d_{11} = D_2$ (variable) | | | |
| $r_{12} = \infty$ (stop) | | | |
| $d_{12} = 1.000$ | | | |
| $r_{13} = 36.018$ | | | |
| $d_{13} = 2.800$ | $n_7 = 1.48749$ | | $\nu_7 = 70.23$ |
| $r_{14} = -89.051$ | | | |
| $d_{14} = 0.250$ | | | |
| $r_{15} = 31.126$ | | | |
| $d_{15} = 2.800$ | $n_8 = 1.48749$ | | $\nu_8 = 70.23$ |
| $r_{16} = 530.196$ | | | |
| $d_{16} = 1.000$ | | | |
| $r_{17} = -40.014$ | | | |
| $d_{17} = 1.540$ | $n_9 = 1.84666$ | | $\nu_9 = 23.78$ |
| $r_{18} = 438.423$ | | | |
| $d_{18} = D_3$ (variable) | | | |
| $r_{19} = 31.221$ | | | |
| $d_{19} = 4.200$ | $n_{10} = 1.56384$ | | $\nu_{10} = 60.67$ |
| $r_{20} = -48.822$ | | | |
| $d_{20} = 11.500$ | | | |
| $r_{21} = -42.255$ | | | |
| $d_{21} = 1.700$ | $n_{11} = 1.79952$ | | $\nu_{11} = 42.22$ |
| $r_{22} = -87.963$ (aspherical surface) | | | | aspherical surface coefficients
(9th Surface)

$k=0.0000$, $A_4=-2.8425\times10^{-6}$, $A_6=6.9470\times10^{-9}$
$A_8=1.0087\times10^{-10}$, $A_{10}=-7.6780\times10^{-13}$ (22nd Surface)

$k=0.0000$, $A_4=2.5343\times10^{-5}$, $A_6=1.0044\times10^{-7}$ $A_8=-4.7840\times10^{-10}$, $A_{10}=2.0039\times10^{12}$

| | | | |
|---|---|---|---|
| f | 28.962 | 62.333 | 135.278 |
| fB | 40.790 | 61.333 | 76.463 |
| $D_1$ | 0.969 | 17.678 | 40.936 |
| $D_2$ | 21.519 | 9.027 | 1.075 |
| $D_3$ | 8.877 | 3.958 | 1.053 |

$f_1/|f_2| = 4.97$, $|f_2|/f_T = -0.15$,
$D_4/h = 0.53$
$f_3/f_4 = (1.74)$, $h/R_{2G} = 0.157$, $D_2/h = 0$

Embodiment 3 f = 28.974~62.300~135.273, F number = 4.777~6.203~7.238,
$2\omega$ = 76.4°~37.0°~17.5°,

| | | | |
|---|---|---|---|
| $r_1 = 171.235$ | | | |
| $d_1 = 2.700$ | $n_1 = 1.80518$ | | $\nu_1 = 25.42$ |
| $r_2 = 65.318$ | | | |
| $d_2 = 7.000$ | $n_2 = 1.48749$ | | $\nu_2 = 70.23$ |
| $r_3 = -233.902$ | | | |
| $d_3 = 0.250$ | | | |
| $r_4 = 47.467$ | | | |
| $d_4 = 5.000$ | $n_3 = 1.74100$ | | $\nu_3 = 52.64$ |
| $r_5 = 126.603$ | | | |
| $d_5$ $D_1$ (variable) | | | |
| $r_6 = 147.095$ | | | |
| $d_6 = 1.750$ | $n_4 = 1.77250$ | | $\nu_4 = 49.60$ |

-continued

Embodiment 3

| | | |
|---|---|---|
| $r_7 = 15.149$ (aspherical surface) | | |
| $d_7$ 5.440 | | |
| $r_8 = -30.189$ | | |
| $d_8 = 1.700$ | $n_5 = 1.72916$ | $\nu_5 = 54.68$ |
| $r_9 = 34.694$ | | |
| $d_9 = 0.200$ | | |
| $r_{10} = 28.963$ | | |
| $d_{10} = 3.250$ | $n_6 = 1.84666$ | $\nu_6 = 23.78$ |
| $r_{11} = -144.835$ | | |
| $d_{11}$ $D_2$ (variable) | | |
| $r_{12} = \sim$ (stop) | | |
| $d_{12} = 1.000$ | | |
| $r_{13} = 30.630$ | | |
| $d_{13} = 2.800$ | $n_7 = 1.48749$ | $\nu_8 = 70.23$ |
| $r_{14} = -88.234$ | | |
| $d_{14} = 0.250$ | | |
| $r_{15} = 28.578$ | | |
| $d_{15} = 2.800$ | $n_8 = 1.48749$ | $\nu_8 = 70.23$ |
| $r_{16} = -368.468$ | | |
| $d_{16} = 1.000$ | | |
| $r_{17} = -38.957$ | | |
| $d_{17} = 1.540$ | $n_9 = 1.84666$ | $\nu_9 = 23.78$ |
| $r_{18} = 735.609$ | | |
| $d_{18} = D_3$ (variable) | | |
| $r_{19} = 41.204$ | | |
| $d_{19} = 5.600$ | $n_{10} = 1.56384$ | $\nu_{10} = 60.67$ |
| $r_{20} = -39.891$ | | |
| $d_{20} = 9.871$ | | |
| $r_{21} = -29.119$ | | |
| $d_{21} = 1.700$ | $n_{11} = 1.79952$ | $\nu_{11} = 42.22$ |
| $r_{22} = -55.173$ (aspherical surface) | | | aspherical surface coefficients
(7th surface)
$k = 0.0000, A_4 = -4.8739 \times 10^7, A_6 = -4.2944 \times 10^{-9}$
$A_8 = 2.9606 \times 10^{-10}, A_{10} = 4.1414 \times 10^{-14}$
(22nd surface)
$k = 0.0000, A_4 = 2.5331 \times 1^{-5}, A_6 = 1.0300 \times 10^{-7}$
$A_8 = -6.3982 \times 10^{-10}, A_{10} = 3.3047 \times 10^{-12}$

| | | | |
|---|---|---|---|
| f | 28.974 | 62.300 | 135.273 |
| fB | 38.979 | 57.084 | 69.031 |
| $D_1$ | 0.941 | 16.799 | 34.904 |
| $D_2$ | 20.678 | 9.584 | 1.136 |
| $D_3$ | 7.247 | 3.371 | 0.981 |

$f_1 / |f_2| = 4.66, |f_2| / f_T = -0.13,$
$D_4/h = 0.46$
$f_3/f_4 = 0.94, h/R_{2G} = 0.147, D_2/h = 0$

Embodiment 4

$f = 28.973\sim62.282\sim135.305$, F number = $4.726\sim6.038\sim7.104$,
$2\omega = 76.5°\sim37.0°\sim17.5°$,

| | | |
|---|---|---|
| $r_1 = 168.068$ | | |
| $d_1 = 2.700$ | $n_1 = 1.80518$ | $\nu_1 = 25.42$ |
| $r_2 = 65.291$ | | |
| $d_2 = 6.900$ | $n_2 = 1.48749$ | $\nu_2 = 70.23$ |
| $r_3 = -184.746$ | | |
| $d_3 = 0.200$ | | |
| $r_4 = 43.593$ | | |
| $d_4 = 4.780$ | $n_3 = 1.71300$ | $\nu_3 = 53.87$ |
| $r_5 = 105.776$ | | |
| $d_5 = D_1$ (variable) | | |
| $r_6 = 131.052$ | | |
| $d_6 = 1.750$ | $n_4 = 1.77250$ | $\nu_4 = 49.60$ |
| $r_7 = 15.268$ (aspherical surface) | | |
| $d_3 = 5.650$ | | |
| $r_8 = -25.195$ | | |
| $d_8 = 1.500$ | $n_5 = 1.72916$ | $\nu_5 = 54.68$ |
| $r_9 = 52.349$ | | |
| $d_9 = 0.200$ | | |
| $r_{20} = 35.965$ | | |
| $d_{10} = 2.900$ | $n_6 = 1.80809$ | $\nu_6 = 22.76$ |
| $r_{11} = -103.144$ | | |
| $d_{11} = D_2$ (variable) | | |
| $r_{12} = \sim$ (stop) | | |
| $d_{12} = 1.000$ | | |
| $r_{13} = 43.288$ | | |
| $d_{13} = 2.800$ | $n_7 = 1.48749$ | $\nu_7 = 70.23$ |
| $r_{14} = -54.349$ | | |
| $d_{14} = 0.200$ | | |
| $r_{15} = 31.339$ | | |
| $d_{15} = 2.800$ | $n_8 = 1.48749$ | $\nu_8 = 70.23$ |
| $r_{16} = -202.719$ | | |
| $d_{16} = 2.634$ | | |
| $r_{17} = -39.405$ | | |
| $d_{17} = 1.540$ | $n_9 = 1.84666$ | $\nu_9 = 23.78$ |
| $r_{18} = -312.358$ | | |
| $d_{18} = D_3$ (variable) | | |
| $r_{19} = 24.576$ | | |
| $d_{19} = 5.900$ | $n_{10} = 1.51633$ | $\nu_{10} = 64.14$ |
| $r_{20} = -33.149$ | | |
| $d_{20} = 2.594$ | | |
| $r_{21} = 315.704$ (aspherical surface) | | |
| $d_{21} = 1.700$ | $n_{11} = 1.75512$ | $\nu_{11} = 45.60$ |
| $r_{22} = 27.892$ | | | aspherical surface coefficients
(7th surface)
$k = 0.0000, A_4 = -3.0861 \times 10^{-7}, A_6 = 1.5585 \times 10^{-8}$
$A_8 = -3.2655 \times 10^{-11}, A_{10} = 2.6660 \times 10^{-12}$
(21st surface)
$k = 0.0000, A_4 = -3.7356 \times 10^{-5}, A_6 = -5.9313 \times 10^{-8}$
$A_8 = -1.3911 \times 10^{-10}, A_{10} = 8.6456 \times 10^{-13}$

| | | | |
|---|---|---|---|
| f | 28.973 | 62.282 | 135.305 |
| fB | 42.479 | 60.445 | 73.393 |
| $D_1$ | 0.900 | 16.536 | 32.970 |
| $D_2$ | 20.730 | 9.705 | 1.137 |
| $D_3$ | 11.191 | 5.179 | 2.199 |

$f_1 / |f_2| = 4.60, |f_2| / f_T = 0.13,$
$D_4/h = 0.12$
$f_3/f_4 = 0.72, h/R_{2G}\ 0.165, D_2/h = 0$

Embodiment 5

$f = 28.978\sim62.250\sim135.270$, F number = $4.679\sim6.004\sim7.184$.
$2\omega = 76.5°\sim37.0°\sim17.5°$,

| | | |
|---|---|---|
| $r_1 = 142.216$ | | |
| $d_1 = 2.700$ | $n_1 = 1.80518$ | $\nu_1 = 25.42$ |
| $r_2 = 60.186$ | | |
| $d_2 = 6.500$ | $n_2 = 1.48749$ | $\nu_2 = 70.23$ |
| $r_3 = -337.896$ | | |
| $d_3 = 0.200$ | | |
| $r_4 = 46.151$ | | |
| $d_4 = 4.650$ | $n_3 = 1.71300$ | $\nu_3 = 53.87$ |
| $r_5 = 138.514$ | | |
| $d_5 = D_1$ (variable) | | |
| $r_6 = 101.250$ | | |
| $d_6 = 1.600$ | $n_4 = 1.77250$ | $\nu_4 = 49.60$ |
| $r_7 = 14.925$ | | |
| $d_7 = 0.080$ | $n_5 = 1.52540$ | $\nu_5 = 51.81$ |
| $r_8 = 15.139$ (aspherical surface) | | |
| $d_8 = 6.136$ | | |
| $r_9 = -26.169$ | | |
| $d_9 = 1.600$ | $n_6 = 1.72916$ | $\nu_6 = 54.68$ |
| $r_{10} = 42.175$ | | |
| $d_{10} = 0.500$ | | |
| $r_{11} = 32.650$ | | |
| $d_{11} = 2.900$ | $n_7 = 1.80809$ | $\nu_7 = 22.76$ |
| $r_{12} = -126.198$ | | |
| $d_{12} = D_2$ (variable) | | |
| $r_{13} = \infty$ (stop) | | |
| $d_{13} = 1.000$ | | |
| $r_{14} = 39.506$ | | |
| $d_{14} = 2.800$ | $n_8 = 1.48749$ | $\nu_8 = 70.23$ |
| $r_{15} = -65.213$ | | |
| $d_{15} = 0.200$ | | |

-continued

Embodiment 5

| | | |
|---|---|---|
| $r_{16} = 32.094$ | | |
| $d_{16} = 2.800$ | $n_9 = 1.48749$ | $\nu_9 = 70.23$ |
| $r_{17} = -120.620$ | | |
| $d_{17} = 3.038$ | | |
| $r_{18} = -34.953$ | | |
| $d_{18} = 1.540$ | $n_{10} = 1.84666$ | $\nu_{10} = 23.78$ |
| $r_{19} = -234.122$ | | |
| $d_{19} = D_3$ (variable) | | |
| $r_{20} = 27.111$ | | |
| $d_{20} = 5.200$ | $n_{11} = 1.51633$ | $\nu_{11} = 64.14$ |
| $r_{21} = -33.298$ | | |
| $d_{21} = 4.677$ | | |
| $r_{22} = -156.822$ (aspherical surface) | | |
| $d_{22} = 1.700$ | $n_{12} = 1.75512$ | $\nu_{12} = 45.60$ |
| $r_{23} = 46.336$ | | | aspherical surface coefficients
(8th surface)
$k = 0.0000$, $A_4 = -1.8371 \times 10^{-7}$, $A_6 = 1.6169 \times 10^{-8}$
$A_8 = 6.8133 \times 10^{-10}$, $A_{10} = -5.7550 \times 10^{-13}$
(22nd surface)
$k = 0.0000$, $A_4 = -3.6801 \times 10^{-5}$, $A_6 = -9.3799 \times 10^{-8}$
$A_8 = 4.3307 \times 10^{-10}$, $A_{10} = -2.3714 \times 10^{-12}$

| | | | |
|---|---|---|---|
| f | 28.978 | 62.250 | 135.270 |
| fB | 41.133 | 58.997 | 73.225 |
| $D_1$ | 0.913 | 17.004 | 33.380 |
| $D_2$ | 19.409 | 9.096 | 1.088 |
| $D_3$ | 10.889 | 5.778 | 2.912 |

$f_1 / |f_2| = 4.77$, $|f_2| / f_T = -0.13$,
$D_4 / h = 0.22$
$f_3 / f_4 = 0.81$, $h / R_{2G} = 0.213$, $D_2 / h = 0$

Embodiment 6 f = 28.973~62.246~135.270, F number = 5.045~6.289~7.088,
$2\omega = 76.5° \sim 37.0° \sim 17.4°$

| | | |
|---|---|---|
| $r_1 = 124.526$ | | |
| $d_1 = 2.550$ | $n_1 = 1.80518$ | $\nu_1 = 25.42$ |
| $r_2 = 52.919$ | | |
| $d_2 = 7.150$ | $n_2 = 1.48749$ | $\nu_2 = 70.23$ |
| $r_3 = -199.548$ | | |
| $d_3 = 0.200$ | | |
| $r_4 = 38.385$ | | |
| $d_4 = 4.780$ | $n_3 = 1.71300$ | $\nu_3 = 53.87$ |
| $r_5 = 105.494$ | | |
| $d_5 = D_1$ (variable) | | |
| $r_6 = 186.556$ | | |
| $d_6 = 1.700$ | $n_4 = 1.77250$ | $\nu_4 = 49.60$ |
| $r_7 = 14.288$ (aspherical surface) | | |
| $d_7 = 5.520$ | | |
| $r_8 = -24.210$ | | |
| $d_8 = 1.350$ | $n_5 = 1.72916$ | $\nu_5 = 54.68$ |
| $r_9 = 34.078$ | | |
| $d_9 = 0.200$ | | |
| $r_{10} = 28.420$ | | |
| $d_{10} = 2.800$ | $n_6 = 1.80809$ | $\nu_6 = 22.76$ |
| $r_{11} = -117.525$ | | |
| $d_{11} = D_2$ (variable) | | |
| $r_{12} = \infty$ (stop) | | |
| $d_{12} = 1.000$ | | |
| $r_{13} = 23.427$ | | |
| $d_{13} = 2.800$ | $n_7 = 1.48749$ | $\nu_7 = 70.23$ |
| $r_{21} = -51.616$ | | |
| $d_{14} = 0.200$ | | |
| $r_{15} = 29.917$ | | |
| $d_{15} = 2.800$ | $n_8 = 1.48749$ | $\nu_8 = 70.23$ |
| $r_{16} = -745.547$ | | |
| $d_{16} = 0.700$ | | |
| $r_{17} = -29.394$ | | |
| $d_{17} = 1.540$ | $n_9 = 1.84666$ | $\nu_9 = 23.78$ |
| $r_{18} = -98.889$ | | |

-continued

Embodiment 6

| | | |
|---|---|---|
| $d_{18} = D_3$ (variable) | | |
| $r_{19} = 34.016$ | | |
| $d_{19} = 5.000$ | $n_{10} = 1.51633$ | $\nu_{10} = 64.14$ |
| $r_{20} = -26.263$ | | |
| $d_{20} = 3.190$ | | |
| $r_{21} = -60.284$ (aspherical surface) | | |
| $d_{21} = 1.700$ | $n_{11} = 1.78590$ | $\nu_{11} = 44.20$ |
| $r_{22} = 54.165$ | | | aspherical surface coefficients
(7th surface)
$k = 0.0000$, $A_4 = -1.1271 \times 10^{-6}$, $A_6 = -5.6169 \times 10^{-8}$
$A_8 = 8.0716 \times 10^{-10}$, $A_{10} = -3.5824 \times 10^{-12}$
(21st surface)
$k = 0.0000$, $A_4 = -4.9730 \times 10^{-5}$, $A_6 = -1.5483 \times 10^{-7}$
$A_8 = 8.2867 \times 1^{-10}$, $A_{10} = -9.0402 \times 10^{-12}$

| | | | |
|---|---|---|---|
| f | 28.973 | 62.246 | 135.270 |
| fB | 40.418 | 56.153 | 65.684 |
| $D_1$ | 0.900 | 15.348 | 28.764 |
| $D_2$ | 17.765 | 9.137 | 0.984 |
| $D_3$ | 8.502 | 4.404 | 1.992 |

$f_1 / |f_2| = 4.51$, $|f_2| / f_T = -0.11$,
$D_4 / h = 0.15$
$f_3 / f_4 = 0.38$, $h / R_{2G} = 0.116$, $D_2 / h = 0$

Embodiment 7 f = 28.985~62.270~135.274, F number = 4.523~5.806~7.088,
$2\omega = 76.5° \sim 37.0° \sim 17.5°$

| | | | |
|---|---|---|---|
| $r_1 = 151.997$ | $d_1 = 2.700$ | $n_1 = 1.80518$ | $\nu_1 = 25.42$ |
| $r_2 = 54.705$ | $d_2 = 6.650$ | $n_2 = 1.48749$ | $\nu_2 = 70.23$ |
| $r_3 = -284.130$ | $d_3 = 0.200$ | | |
| $r_4 = 43.317$ | $d_4 = 5.000$ | $n_3 = 1.65844$ | $\nu_3 = 50.88$ |
| $r_5 = 177.308$ | $d_5 = D_1$ (variable) | | |
| $r_6 = 251.244$ | $d_6 = 1.600$ | $n_4 = 1.77250$ | $\nu_4 = 49.60$ |
| $r_7 = 15.857$ | $d_7 = 4.477$ | | |
| $r_8 = -70.608$ | $d_8 = 1.600$ | $n_5 = 1.72916$ | $\nu_5 = 54.68$ |
| $r_9 = 28.141$ | $d_9 = 0.200$ | | |
| $r_{10} = 23.641$ | $d_{10} = 3.450$ | $n_6 = 1.84666$ | $\nu_6 = 23.78$ |
| $r_{11} = -171.788$ | $d_{11} = 0.900$ | | |
| $r_{12} = -36.722$ | $d_{12} = 1.450$ | $n_7 = 1.77250$ | $\nu_7 = 49.60$ |
| $r_{13} = -138.879$ | $d_{13} = D_2$ (variable) | | |
| $r_{14} = \infty$ (stop) | $d_{14} = 1.000$ | | |
| $r_{15} = 40.925$ | $d_{15} = 2.800$ | $n_8 = 1.48749$ | $\nu_8 = 70.23$ |
| $r_{16} = -51.775$ | $d_{16} = 0.200$ | | |
| $r_{17} = 27.338$ | $d_{17} = 2.800$ | $n_9 = 1.48749$ | $\nu_9 = 70.23$ |
| $r_{18} = 15871.000$ | $d_{18} = 2.798$ | | |
| $r_{19} = -39.168$ | $d_{19} = 1.540$ | $n_{10} = 1.80809$ | $\nu_{10} = 22.76$ |
| $r_{20} = -2700.401$ | $d_{20} = D_3$ (variable) | | |
| $r_{21} = 35.233$ | $d_{21} = 5.000$ | $n_{11} = 1.51633$ | $\nu_{11} = 64.14$ |
| $r_{22} = -39.501$ | $d_{22} = 6.779$ | | |
| $r_{23} = -400.000$ (aspherical surface) | $d_{23} = 1.700$ | $n_{12} = 1.75512$ | $\nu_{12} = 45.60$ |
| $r_{24} = 67.142$ | | | | aspherical surface coefficients
(23rd surface)

$k = 0.0000$, $A_4 = -2.8040 \times 10^{-5}$, $A_6 = -4.9662 \times 10^{-8}$
$A_8 = -3.6171 \times 10^{-12}$, $A_{10} = -4.7800 \times 10^{-13}$

| | | | |
|---|---|---|---|
| f | 28.985 | 62.270 | 135.274 |
| fB | 39.910 | 58.023 | 74.321 |
| $D_1$ | 0.900 | 15.972 | 30.772 |
| $D_2$ | 19.662 | 9.225 | 1.114 |
| $D_3$ | 9.973 | 4.719 | 1.879 |

$f_1 / |f_2| = 4.62$, $|f_2| / f_T = -0.12$, $D_4 / h = 0.31$
$f_3 / f_4 = 0.78$, $h / R_{2G} = 0.086$, $D_2 / h = 0$

Embodiment 8
f = 28.977~62.311~135.255, F number = 4.752~5.991~7.150,
2ω = 76.5°~36.9°~17.4°,

| | | | |
|---|---|---|---|
| $r_1$ = 107.238 | $d_1$ = 2.700 | $n_1$ = 1.80518 | $\nu_1$ = 25.42 |
| $r_2$ = 45.584 | $d_2$ = 7.000 | $n_2$ = 1.48749 | $\nu_2$ = 70.23 |
| $r_3$ = −375.873 | $d_3$ = 0.200 | | |
| $r_4$ = 38.916 | $d_4$ = 4.800 | $n_3$ = 1.65844 | $\nu_3$ = 50.88 |
| $r_5$ = 179.245 | $d_5$ = $D_1$ (variable) | | |
| $r_6$ = 384.333 | $d_6$ = 1.600 | $n_4$ = 1.77250 | $\nu_4$ = 49.60 |
| $r_7$ = 14.647 | $d_7$ = 4.300 | | |
| $r_8$ = −85.111 | $d_8$ = 1.550 | $n_5$ = 1.72916 | $\nu_5$ = 54.68 |
| $r_9$ = 25.952 | $d_9$ = 0.150 | | |
| $r_{10}$ = 21.031 | $d_{10}$ = 3.450 | $n_6$ = 1.84666 | $\nu_6$ = 23.78 |
| $r_{11}$ = −390.555 | $d_{11}$ = 0.900 | | |
| $r_{12}$ = −41.249 | $d_{12}$ = 1.300 | $n_7$ = 1.77250 | $\nu_7$ = 49.60 |
| $r_{13}$ = −1572.096 | $d_{13}$ = $D_2$ (variable) | | |
| $r_{14}$ = ∞ (stop) | $d_{14}$ = 1.000 | | |
| $r_{15}$ = 22.662 | $d_{15}$ = 2.800 | $n_8$ = 1.48749 | $\nu_8$ = 70.23 |
| $r_{16}$ = −68.646 | $d_{16}$ = 0.200 | | |
| $r_{17}$ = 32.666 | $d_{17}$ = 2.800 | $n_9$ = 1.48749 | $\nu_9$ = 70.23 |
| $r_{18}$ = −1735.260 | $d_{18}$ = 0.800 | | |
| $r_{19}$ = −28.112 | $d_{19}$ = 1.540 | $n_{10}$ = 1.80809 | $\nu_{10}$ = 22.76 |
| $r_{20}$ = −83.490 | $d_{20}$ = $D_3$ (variable) | | |
| $r_{21}$ = 35.586 | $d_{21}$ = 5.000 | $n_{11}$ = 1.51633 | $\nu_{11}$ = 64.14 |
| $r_{22}$ = −29.673 | $d_{22}$ = 4.045 | | |
| $r_{23}$ = −103.663 | $d_{23}$ = 1.700 | $n_{12}$ = 1.78590 | $\nu_{12}$ = 44.20 |
| $r_{24}$ = 60.309 | | | | aspherical surface coefficients
(23rd surface)

k = 0.0000, $A_4$ = −4.5761 × 10$^{-5}$, $A_6$ = −9.7111 × 10$^{-8}$
$A_8$ = −4.8450 × 10$^{-12}$, $A_{10}$ = 1.7769 × 10$^{-13}$

| | | | |
|---|---|---|---|
| f | 28.977 | 62.311 | 135.255 |
| fB | 41.289 | 57.273 | 71.177 |
| $D_1$ | 0.900 | 14.473 | 26.496 |
| $D_2$ | 17.369 | 8.602 | 0.752 |
| $D_3$ | 6.776 | 3.232 | 0.982 |

$f_1 / |f_2|$ = 4.47, $|f_2|/ f_T$ = −0.11, $D_4/h$ = 0.19
$f_3 / f_4$ = 0.54, $h / R_{2G}$ = 0.056, $D_2/h$ = 0

Embodiment 9
f = 28.972~62.227~135.210, F number = 4.752~5.991~7.150,
2ω = 76.5°~36.9°~17.5°,

| | | | |
|---|---|---|---|
| $r_1$ = 102.286 | $d_1$ = 2.700 | $n_1$ = 1.80518 | $\nu_1$ = 25.42 |
| $r_2$ = 44.313 | $d_2$ = 7.000 | $n_2$ = 1.48749 | $\nu_2$ = 70.23 |
| $r_3$ = −486.799 | $d_3$ = 0.200 | | |
| $r_4$ = 38.783 | $d_4$ = 4.800 | $n_3$ = 1.65844 | $\nu_3$ = 50.88 |
| $r_5$ = 189.121 | $d_5$ = $D_1$ (variable) | | |
| $r_6$ = 346.854 | $d_6$ = 1.600 | $n_4$ = 1.77250 | $\nu_4$ = 49.60 |
| $r_7$ = 14.581 | $d_7$ = 4.300 | | |
| $r_8$ = −83.457 | $d_8$ = 1.550 | $n_5$ = 1.72916 | $\nu_5$ = 54.68 |
| $r_9$ = 25.335 | $d_9$ = 0.150 | | |
| $r_{10}$ = 20.816 | $d_{10}$ = 3.450 | $n_6$ = 1.84666 | $\nu_6$ = 23.78 |
| $r_{11}$ = −331.085 | $d_{11}$ = 0.900 | | |
| $r_{12}$ = −39.770 | $d_{12}$ = 1.300 | $n_7$ = 1.77250 | $\nu_7$ = 49.60 |
| $r_{13}$ = −966.613 | $d_{13}$ = $D_2$ (variable) | | |
| $r_{14}$ = ∞ (stop) | $d_{14}$ = 1.000 | | |
| $r_{15}$ = 21.806 | $d_{15}$ = 2.800 | $n_8$ = 1.48749 | $\nu_8$ = 70.23 |
| $r_{16}$ = −64.815 | $d_{16}$ = 0.200 | | |
| $r_{17}$ = 38.125 | $d_{17}$ = 2.800 | $n_9$ = 1.48749 | $\nu_9$ = 70.23 |
| $r_{18}$ = 237.613 | $d_{18}$ = 0.800 | | |
| $r_{19}$ = −26.123 | $d_{19}$ = 1.540 | $n_{10}$ = 1.80809 | $\nu_{10}$ = 22.76 |
| $r_{20}$ = −70.981 | $d_{20}$ = $D_3$ (variable) | | |
| $r_{21}$ = 36.677 | $d_{21}$ = 5.000 | $n_{11}$ = 1.51633 | $\nu_{11}$ = 64.14 |
| $r_{22}$ = −29.757 | $d_{22}$ = 3.913 | | |
| $r_{23}$ = −169.606 (aspherical surface) | $d_{23}$ = 0.050 | $n_{12}$ = 1.52288 | $\nu_{12}$ = 52.50 |
| $r_{24}$ = −100.000 | $d_{24}$ = 1.650 | $n_{13}$ = 1.78590 | $\nu_{13}$ = 44.20 |
| $r_{25}$ = 54.197 | | | |

Embodiment 9
f = 28.972~62.227~135.210, F number = 4.752~5.991~7.150,
2ω = 76.5°~36.9°~17.5°, aspherical surface coefficients
(23rd surface)

k = 0.0000, $A_4$ = −6.8360 × 10$^{-5}$, $A_6$ = 6.8001 × 10$^{-8}$
$A_8$ = −2.5352 × 10$^{-9}$, $A_{10}$ = 1.6368 × 10$^{-11}$

| | | | |
|---|---|---|---|
| f | 28.972 | 62.227 | 135.210 |
| fB | 41.519 | 57.411 | 71.684 |
| $D_1$ | 0.900 | 14.434 | 26.247 |
| $D_2$ | 17.238 | 8.570 | 0.761 |
| $D_3$ | 6.642 | 2.995 | 0.819 |

$f_1 / |f_2|$ = 4.48, $|f_2|/f_T$ = −0.11, $D_4/h$ = 0.18
$f_3 / f_4$ = 0.52, $h / R_{2G}$ = 0.062, $D_2/h$ = 0

Embodiment 10
f = 28.980~64.745~145.260, F number = 4.305~5.665~7.078,
2ω = 76.4°~35.8°~16.4°,

| | | | |
|---|---|---|---|
| $r_1$ = 148.634 | $d_1$ = 2.700 | $n_1$ = 1.80518 | $\nu_1$ = 25.42 |
| $r_2$ = 54.752 | $d_2$ = 6.650 | $n_2$ = 1.48749 | $\nu_2$ = 70.23 |
| $r_3$ = −261.516 | $d_3$ = 0.200 | | |
| $r_4$ = 40.877 | $d_4$ = 5.000 | $n_3$ = 1.65844 | $\nu_3$ = 50.88 |
| $r_5$ = 141.604 | $d_5$ = $D_1$ (variable) | | |
| $r_6$ = 107.490 | $d_6$ = 1.500 | $n_4$ = 1.77250 | $\nu_4$ = 49.60 |
| $r_7$ = 14.845 | $d_7$ = 4.500 | | |
| $r_8$ = −43.168 | $d_8$ = 1.400 | $n_5$ = 1.72916 | $\nu_5$ = 54.68 |
| $r_9$ = 39.431 | $d_9$ = 0.200 | | |
| $r_{10}$ = 27.458 | $d_{10}$ = 3.450 | $n_6$ = 1.84666 | $\nu_6$ = 23.78 |
| $r_{11}$ = −82.928 | $d_{11}$ = 0.900 | | |
| $r_{12}$ = −29.851 | $d_{12}$ = 1.450 | $n_7$ = 1.77250 | $\nu_7$ = 49.60 |
| $r_{13}$ = −126.325 | $d_{13}$ = $D_2$ (variable) | | |
| $r_{14}$ = ∞ (stop) | $d_{14}$ = 1.000 | | |
| $r_{15}$ = 37.913 | $d_{15}$ = 2.800 | $n_8$ = 1.48749 | $\nu_8$ = 70.23 |
| $r_{16}$ = 49.810 | $d_{16}$ = 0.200 | | |
| $r_{17}$ = 27.987 | $d_{17}$ = 2.800 | $n_9$ = 1.48749 | $\nu_9$ = 70.23 |
| $r_{18}$ = −339.010 | $d_{18}$ = 1.728 | | |
| $r_{19}$ = −36.890 | $d_{19}$ = 1.540 | $n_{10}$ = 1.80809 | $\nu_{10}$ = 22.76 |
| $r_{20}$ = −325.148 | $d_{20}$ = $D_3$ (variable) | | |
| $r_{21}$ = 36.670 | $d_{21}$ = 5.000 | $n_{11}$ = 1.51633 | $\nu_{11}$ = 64.14 |
| $r_{22}$ = −37.908 | $d_{22}$ = 6.622 | | |
| $r_{23}$ = −222.149 (aspherical surface) | $d_{23}$ = 1.700 | $n_{12}$ = 1.75512 | $\nu_{12}$ = 45.60 |
| $r_{24}$ = 59.830 | | | | aspherical surface coefficients
(23rd surface)

k = 0.0000, $A_4$ = −3.1468 × 10$^{-5}$, $A_6$ = −5.8852 × 10$^{-8}$
$A_8$ = −4.4515 × 10$^{-11}$, $A_{10}$ = −2.0747 × 10$^{-13}$

| | | | |
|---|---|---|---|
| f | 28.980 | 64.745 | 145.260 |
| fB | 38.918 | 58.656 | 77.304 |
| $D_1$ | 0.900 | 15.936 | 30.326 |
| $D_2$ | 18.887 | 8.656 | 0.737 |
| $D_3$ | 9.645 | 4.176 | 1.516 |

$f_1 / |f_2|$ = 4.72, $|f_2|/f_T$ = −0.11, $D_4/h$ = 0.31
$f_3 / f_4$ = 0.61, $h / R_{2G}$ = 0.201, $D_2/h$ = 0

Embodiment 11
f = 28.967~62.272~135.280, F number = 4.928~6.174~7.177,
2ω = 76.2°~37.1°~17.5°,

| | | | |
|---|---|---|---|
| $r_1$ = 213.992 | $d_1$ = 2.700 | $n_1$ = 1.80518 | $\nu_1$ = 25.42 |
| $r_2$ = 52.239 | $d_2$ = 6.750 | $n_2$ = 1.56384 | $\nu_2$ = 60.67 |

-continued

Embodiment 11
f = 28.967~62.272~135.280, F number = 4.928~6.174~7.177,
2ω = 76.2°~37.1°~17.5°,

| | | | |
|---|---|---|---|
| $r_3 = -274.542$ | $d_3 = 0.200$ | | |
| $r_4 = 43.295$ | $d_4 = 4.600$ | $n_3 = 1.60562$ | $v_3 = 43.70$ |
| $r_5 = 194.322$ | $d_5 = D_1$ (variable) | | |
| $r_6 = 228.798$ | $d_6 = 1.600$ | $n_4 = 1.77250$ | $v_4 = 49.60$ |
| $r_7 = 15.510$ | $d_7 = 4.358$ | | |
| $r_8 = -53.699$ | $d_8 = 1.500$ | $n_5 = 1.71300$ | $v_5 = 53.87$ |
| $r_9 = 37.564$ | $d_9 = 0.200$ | | |
| $r_{10} = 26.272$ | $d_{10} = 3.450$ | $n_6 = 1.84666$ | $v_6 = 23.78$ |
| $r_{11} = -104.639$ | $d_{11} = 0.850$ | | |
| $r_{12} = -38.725$ | $d_{12} = 1.350$ | $n_7 = 1.77250$ | $v_7 = 49.60$ |
| $r_{13} = -6672.969$ | $d_{13} = D_2$ (variable) | | |
| $r_{14} = \infty$ (stop) | $d_{14} = 1.000$ | | |
| $r_{15} = 44.199$ | $d_{15} = 2.800$ | $n_8 = 1.48749$ | $v_8 = 70.23$ |
| $r_{16} = -46.651$ | $d_{16} = 0.200$ | | |
| $r_{17} = 28.178$ | $d_{17} = 2.800$ | $n_9 = 1.48749$ | $v_9 = 70.23$ |
| $r_{18} = -602.831$ | $d_{18} = 4.212$ | | |
| $r_{19} = -33.980$ | $d_{19} = 1.540$ | $n_{10} = 1.80809$ | $v_{10} = 22.76$ |
| $r_{20} = -215.450$ | $d_{20} = D_3$ (variable) | | |
| $r_{21} = 36.879$ | $d_{21} = 4.900$ | $n_{11} = 1.51633$ | $v_{11} = 64.14$ |
| $r_{22} = -42.083$ | $d_{22} = 8.329$ | | |
| $r_{23} = -251.989$ | $d_{23} = 1.700$ | $n_{12} = 1.76200$ | $v_{12} = 40.10$ |
| $r_{24} = 104.273$ | | | | aspherical surface coefficients
(23rd surface)

| | | |
|---|---|---|
| k = 0.0000, | $A_4 = -2.5660 \times 10^{-5}$, | $A_6 = -4.9630 \times 10^{-8}$ |
| | $A_8 = -3.0611 \times 10^{-11}$, | $A_{10} = -8.3544 \times 10^{-14}$ |
| f | 28.967 | 62.272 | 135.280 |
| fB | 38.288 | 58.500 | 75.361 |
| $D_1$ | 0.900 | 16.214 | 32.970 |
| $D_2$ | 17.536 | 8.141 | 1.386 |
| $D_3$ | 10.138 | 3.951 | 0.855 |

$f_1/|f_2|_{-5.04}$, $|f_2|/f_T = -0.12$, $D_4/h = 0.39$
$f_3/f_{4-0.76}$, $h_{/R2G} = 0.094$, $D_2/h = 0$

Embodiment 12
f = 28.970~62.250~135.291, F number = 4.924~6.283~7.009,
2ω = 76.3°~37.1°~17.4°,

| | | | |
|---|---|---|---|
| $r_1 = 214.871$ | $d_1 = 2.700$ | $n_1 = 1.80518$ | $v_1 = 25.42$ |
| $r_2 = 65.661$ | $d_2 = 6.550$ | $n_2 = 1.48749$ | $v_2 = 70.23$ |
| $r_3 = -195.522$ | $d_3 = 0.200$ | | |
| $r_4 = 47.433$ | $d_4 = 4.750$ | $n_3 = 1.65844$ | $v_3 = 50.88$ |
| $r_5 = 160.735$ | $d_5$ $D_1$ (variable) | | |
| $r_6 = 348.794$ | $d_6 = 1.600$ | $n_4 = 1.77250$ | $v_4 = 49.60$ |
| $r_7 = 16.320$ | $d_7 = 4.176$ | | |
| $r_8 = -64.926$ | $d_8 = 1.550$ | $n_5 = 1.72916$ | $v_5 = 54.68$ |
| $r_9 = 32.049$ | $d_9 = 0.200$ | | |
| $r_{10} = 25.457$ | $d_{10} = 3.450$ | $n_6 = 1.84666$ | $v_6 = 23.78$ |
| $r_{11} = -157.386$ | $d_{11} = 0.900$ | | |
| $r_{12} = -36.496$ | $d_{12} = 1.350$ | $n_7 = 1.77250$ | $v_7 = 49.60$ |
| $r_{13} = -124.523$ | $d_{23} = D_2$ (variable) | | |
| $r_{14} = \infty$ (stop) | $d_{14} = 1.000$ | | |
| $r_{15} = 41.115$ | $d_{15} = 2.800$ | $n_8 = 1.48749$ | $v_8 = 70.23$ |
| $r_{16} = -48.637$ | $d_{16} = 0.200$ | | |
| $r_{17} = 27.280$ | $d_{17} = 2.800$ | $n_9 = 1.48749$ | $v_9 = 70.23$ |
| $r_{18} = -2484.952$ | $d_{18} = 3.452$ | | |
| $r_{19} = -37.485$ | $d_{19} = 1.540$ | $n_{10} = 1.80809$ | $v_{10} = 22.76$ |
| $r_{20} = -613.074$ | $d_{20} = D_3$ (variable) | | |
| $r_{21} = 32.893$ | $d_{21} = 4.900$ | $n_{11} = 1.51633$ | $v_{11} = 64.14$ |
| $r_{22} = -44.370$ | $d_{22} = 7.113$ | | |
| $r_{23} = 2810.285$ | | | |
| (aspherical surface) | | | |
| $d_{23} = 1.700$ | $n_{12} = 1.75512$ | $v_{12} = 45.60$ | |
| $r_{24} = 56.573$ | | | |

-continued

Embodiment 12
f = 28.970~62.250~135.291, F number = 4.924~6.283~7.009,
2ω = 76.3°~37.1°~17.4°, aspherical surface coefficients
(23rd surface)

| | | |
|---|---|---|
| k = 0.0000, | $A_4 = -2.8223 \times 10^{-5}$, | $A_6 = -1.0444 \times 10^{-7}$ |
| | $A_8 = 7.2762 \times 10^{12}$, | $A_{10} = -4.0745 \times 10^{-12}$ |
| f | 28.970 | 62.250 | 135.291 |
| fB | 37.852 | 59.181 | 74.286 |
| $D_1$ | 0.900 | 15.825 | 35.410 |
| $D_2$ | 18.314 | 8.014 | 1.069 |
| $D_3$ | 10.370 | 4.353 | 1.439 |

$f_1/|f_2|_{-5.08}$, $|f_2|/f_T = -0.13$, $D_4/h = 0.33$
$f_3/f_{4-0.72}$, $h_{/R2G} = 0.062$, $D_2/h = 0$ wherein reference symbols $r_1, r_2, \ldots$ represent radii of curvature on surfaces of respective lens elements, reference symbols $d_1, d_2, \ldots$ designate thicknesses of the respective lens elements and airspaces reserved therebetween, reference symbols $n_1, n_2 \ldots$ denote refractive indices of the respective lens elements, and reference symbols $v_1, v_2, \ldots$ represent Abbe's numbers of the respective lens elements.

The first through sixth embodiment is a zoom lens system having compositions illustrated in FIGS. 1 through 6, in which a first lens unit consists of a cemented lens component consisting of a negative lens element and a positive lens element and a positive meniscus lens element, a second lens unit consists of a first negative lens component and a second lens component consisting of a negative lens element and a third lens component consisting of a positive lens element, an aperture stop is disposed on the image side of the second lens unit, a third lens unit consists of a subunit having positive refractive power consisting of a positive lens element and a positive lens element and a subunit consisting of a negative lens element, and a fourth lens unit consists of a front subunit consisting of a positive lens element and a rear subunit consisting of a negative lens element.

Out of these embodiments, the first embodiment uses an aspherical surface as an object side surface ($r_{21}$) of the negative lens element used as the rear subunit of the fourth lens unit.

Furthermore, the second embodiment uses aspherical surfaces as an image side surface ($r_9$) of the negative lens element disposed as the second lens component of the second lens unit and as a final surface, that is, an image side surface ($r_{22}$) of the negative lens element disposed as the rear subunit of the fourth lens unit.

The third embodiment uses aspherical surfaces as an image side surface ($r_7$) of the most object side lens component disposed as the first lens component (negative lens component) of the second lens unit and an image side surface ($r_{22}$) of the negative lens element disposed as the rear subunit of the fourth lens unit.

The fourth embodiment uses aspherical surfaces as an image side surface ($r_7$) of the negative lens element disposed as a first lens component of the second lens unit and an object side surface ($r_{21}$) of the negative lens element disposed as the rear subunit of the fourth lens unit.

The fifth embodiment uses a hybrid lens component consisting of a glass lens ($r_6$ to $r_7$) having a resin layer on the image side as the first lens component disposed on the most image side in the second lens unit as the first lens component of the second lens unit and an aspherical surface as an image side surface ($r_6$) of the resin layer ($r_7$ to $r_8$) of the hybrid lens component. Furthermore, the fifth embodiment uses an aspherical surface as an object side surface of the negative lens element disposed as the rear subunit of the fourth lens unit.

The sixth embodiment uses aspherical surfaces as an image side surface ($r_7$) of the most objective side negative lens element of the second lens unit disposed as the first lens component of the second lens unit and an object side surface ($r_{21}$) of the negative lens element disposed as the rear subunit of the fourth lens unit.

The seventh through twelfth embodiments have compositions illustrated in FIGS. 7 through 12 respectively, in which a first lens unit consists of a cemented lens component consisting of a negative lens element and a positive lens element and a positive meniscus lens element, a second lens unit consists of a first lens component consisting of a negative lens element, a second lens component consisting of a negative lens element, a third lens component consisting of a positive lens element and a fourth lens component consisting of a negative lens element, an aperture stop is disposed on the image side of the second lens unit, a third lens unit consists of a subunit having positive refractive power consisting of a positive lens element and a positive lens element, and a subunit having negative refractive power consisting of a negative lens element, and a fourth lens unit consists of a front subunit consisting of a positive lens element and a rear lens unit consisting of a negative lens element.

That is, each of the seventh through twelfth embodiment uses the second lens unit which consists of four lens components of the first negative lens component, the second negative lens component, the third positive lens component and the fourth negative lens component and is different in a composition of the second lens unit from the first through six embodiments which uses the second lens unit consisting of three negative, negative and positive lens components.

Furthermore, each of the seventh and eighth embodiments uses an aspherical surface as an object side surface ($r_{23}$) of the negative lens element disposed as the rear subunit of the fourth lens unit. The ninth embodiment uses a hybrid lens which is a glass lens ($r_{24}$ to $r_{25}$) having a resin layer ($r_{23}$ to $r_{24}$) on a front surface as the negative lens component disposed as the rear subunit of the fourth lens unit and an aspherical surface as an object side surface ($r_{23}$) of the resin layer. Like the seventh or eighth embodiment, each of the tenth through twelfth embodiments uses an aspherical surface as an object side surface ($r_{23}$) of the negative lens element of the rear subunit of the fourth lens unit.

Shapes of the aspherical surfaces used in the above described embodiments are expressed by the following formula:

$$z=(y^2/r)/[1+\{1-(k+1)(y/r)^2\}^{1/2}]+A_2y^2+A_4y^4+A_6y^6+A_8y^8+A_{10}y^{10}+$$

wherein a direction of an optical axis is taken as a z axis, a direction perpendicular to the optical axis is taken as a y axis, a reference symbol r represents a radius of curvature on a reference sphere, a reference symbol k designates a conical coefficient, and reference symbols $A_2$, $A_4$ . . . denote aspherical surface coefficients of the second, fourth, . . . orders respectively.

Figure 13:
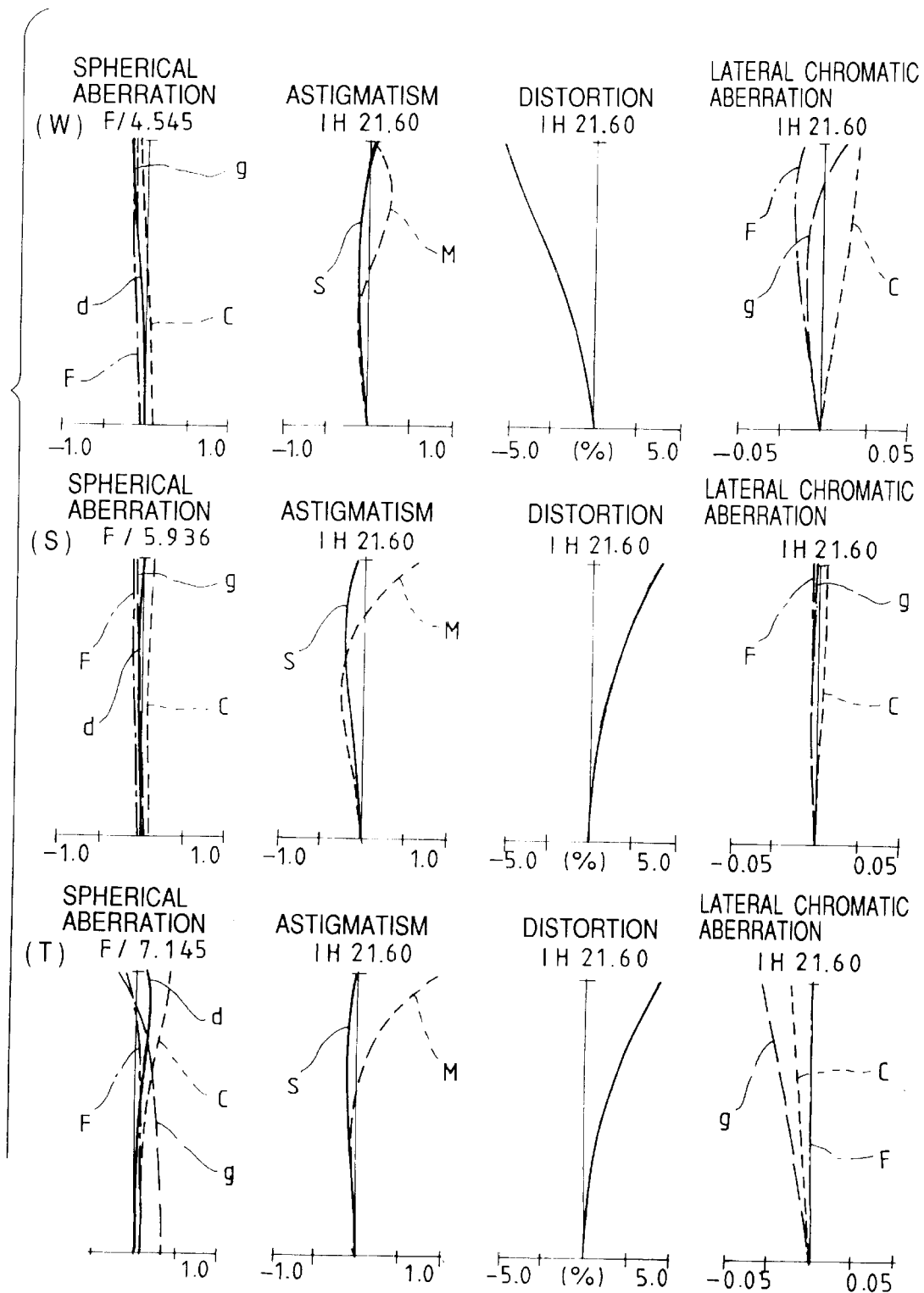
FIG. 13 shows curves illustrating aberration characteristics of the first embodiment of the present invention.

In FIGS. 1 through 12 illustrating the compositions of the embodiments, an upper stage (W) corresponds to the wide position, a middle stage (S) corresponds to an intermediate focal length and a lower stage (T) corresponds to the tele position. Aberration characteristics of the first embodiment are illustrated in FIG. 13. In FIGS. 1 through 12, a reference symbol I represents an image to be photographed and a reference symbol h designates a maximum height of the image. Furthermore, reference symbols (W), (S) and (T) in FIG. 13 are aberrations curves at the wide position, intermediate focal length and tele position respectively.

As illustrated by the aberration curves (FIG. 13), the zoom lens system according to the present invention favorably corrects aberrations at all the wide position (W), the intermediate focal length (S) and the tele position (T). Furthermore, aberrations which are varied little among the wide position, the intermediate focal length and the tele position indicate that the zoom lens system according to the first embodiment varies aberrations little when a magnification is changed from the wide position to the tele position.

In addition, the second through twelfth embodiments have aberration characteristics similar to those of the first embodiment, thereby correcting aberrations favorably and allow aberrations to be varied little.

Figure 14:
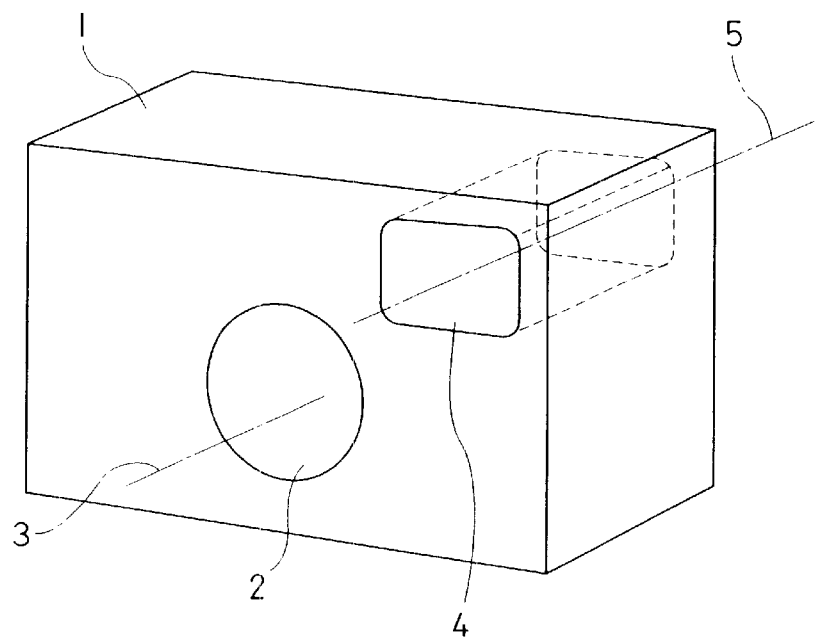
FIG. 14 is perspective view showing a compact camera which uses the zoom lens system according to the present invention as an image pickup lens.
Figure 15:
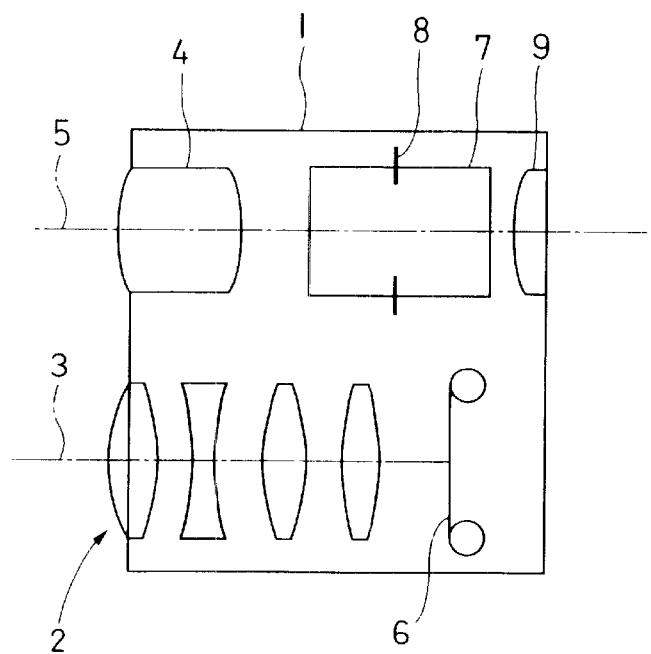
FIG. 15 is a sectional view of the camera shown in FIG. 14.

The above described zoom lens system according to the present invention is used as a photographic lens system for a compact camera, for example, an shown in FIGS. 14 and 15. In FIGS. 14 and 15, a reference numeral 1 represents a camera body, a reference numeral 2 designates a photographic lens system, a reference numeral 3 denotes a photographing optical path, a reference numeral 4 represents a view finder optical system, a reference numeral 5 designates an optical path for the view finder optical system, a reference numeral 6 denotes a film disposed on an imaging surface of the photographic lens system, a reference numeral 7 represents an image erecting prism of a view finder, a reference numeral 8 designates a stop and a reference numeral 9 denotes an eye piece of the view finder. Rays which are imaged by the photographic lens system on the film 6 and incident on the view finder in which the optical path 3 for the photographic lens system 2 and an 15 optical path 5 are disposed in parallel with each other pass through the image erecting prism 7 and the eyepiece 9, and are observed by an observer.

The zoom lens system according to the present invention is used as the photographic lens system 2 of this camera.

Figure 16:
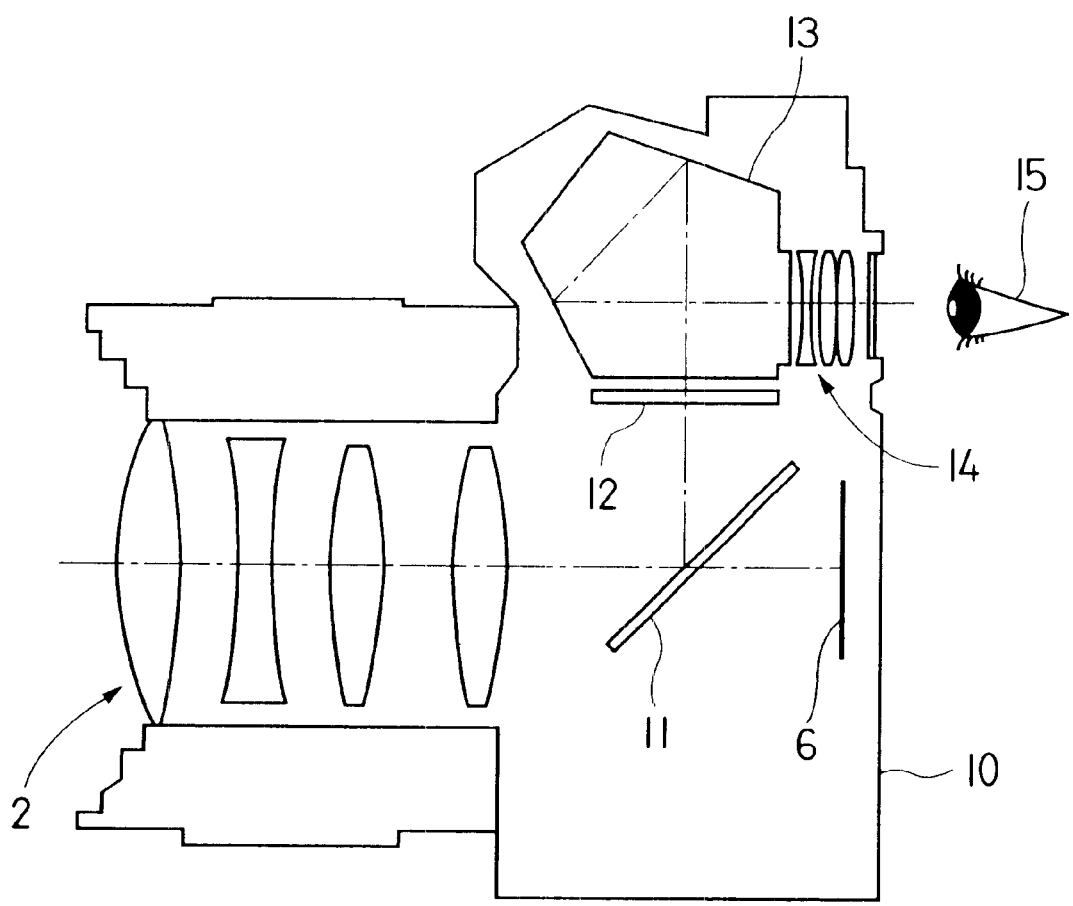
FIG. 16 is a sectional view of a single-lens reflex camera which uses the zoom lens system according to the present invention.

Furthermore, FIG. 16 shows a single lens reflex camera which uses the zoom lens system according to the present invention. In FIG. 16, a reference numeral 10 represents a single-lens reflex camera, a reference symbol 2 designates a photographic lens system, a reference numeral 6 denotes a film, a reference numeral 11 represents a quick return mirror which is disposed in an optical path 3 of the photographic lens system 2 between the lens system 2 and the film 6, a reference numeral 12 designates a view finder screen disposed in an optical path reflected from the quick return mirror, a reference numeral 13 denotes a pentagonal prism, a reference numeral 14 represents a view finder and a reference numeral 15 designates an observer's eye (eye point).

The zoom lens system according to the present invention is used as the photographic lens system 2 of the single-lens reflex camera 10.

According to the present invention, it is possible to realize a zoom lens system which has a high vari-focal ratio, a compact design, a small number of lens element, a field angle exceeding 65° and favorable optical performance over a broad vari-focal range from a wide position to a tele position.

What is claimed is:

1. A zoom lens system comprising, in order from an object side: a first lens unit having positive refractive power; a second lens unit having negative refractive power; a third lens unit having positive refractive power; and a fourth lens unit having positive refractive power, wherein a magnification is changed from a wide position to a tele position by moving said first lens unit toward the object side, moving said second lens unit so as to widen an airspace between said first and said second lens unit, moving said third lens unit so as to narrow an airspace between said second lens unit and said third lens unit and moving said fourth lens unit so as to reserve an airspace between said third lens unit and said fourth lens unit which is narrower at the tele position than that at the wide position wherein an aperture stop is disposed on an image side of said second lens unit and on the object side of said fourth lens unit, wherein said fourth lens unit consists of a front subunit having positive refractive power and a rear subunit having negative refractive power, and wherein said zoom lens system satisfies the following conditions (1), (2) and (3):

$$4.1 < f_1/|f_2| < 5.0 \tag{1}$$

$$0.07 < |f_2|/f_T < 0.16 \tag{2}$$

$$0.1 < D_4/h < 0.7 \tag{3}$$

wherein reference symbols $f_1$ and $f_2$ represent focal lengths of the first lens unit and the second lens unit respectively, a reference symbol $f_T$ designates a focal length of the zoom lens system as a whole at the tele position, a reference symbol $D_4$ denotes an airspace between the front lens unit and the rear lens unit of the fourth lens unit, and a reference symbol h denotes a maximum height of an image to be photographed.

2. The zoom lens system according to claim 1 satisfying, in place of the conditions (1) and (3), the following conditions (1-1) and (3-1):

$$4.1 < f_1/|f_2| < 5.3 \tag{1-1}$$

$$0.15 < D_4/h < 0.7 \tag{3-1}$$

3. A zoom lens system comprising, in order from an object side: a first lens unit having positive refractive power; a second lens unit having negative refractive power; a third lens unit having positive refractive power; and a fourth lens unit having positive refractive power, wherein a magnification is changed from a wide position to a tele position by moving the first lens unit toward the object side, moving the second lens unit so as to widen an airspace between the first lens unit and the second lens unit, moving the third lens unit so as to narrow an airspace between the second lens unit and the third lens unit and moving the fourth lens unit so as to reserve an airspace at the tele position which is narrower than that at the wide position, wherein said first lens unit consists, in order from the object side, of a negative lens element, a positive lens element and a positive meniscus lens element having a convex surface on the object side, wherein said second lens unit consists, in order from the object side, of a negative lens component, a negative lens component, a positive lens component and a negative lens component disposed with an airspace reserved between each pair of the lens components, wherein said third lens unit consists, in order from the object side, of a subunit having positive refractive power and negative lens component disposed with an airspace reserved between said subunit and the negative lens component, wherein said fourth lens unit consists of a front subunit having positive refractive power and a rear subunit having negative refractive power, and wherein the zoom lens system satisfies the following conditions (1), (3) and (4):

$$4.1 < f_1/|f_2| < 5.0 \tag{1}$$

$$0.1 < D_4/h < 0.7 \tag{3}$$

$$0.2 < f_3/f_4 < 1.1 \tag{4}$$

wherein reference symbols $f_1$, $f_2$, $f_3$, and $f_4$ represent focal lengths of the first lens unit, the second lens unit, the third lens unit and the fourth lens unit respectively, a reference symbol $D_4$ designates an airspace between the front subunit and the rear subunit of the fourth lens unit, and a reference symbol h denotes a maximum height of an image to be photographed.

4. The zoom lens system according to claim 1 or 2 having a vari-focal ratio not lower than 4.5.

5. The zoom lens system according to claim 1, 2 or 3, wherein a positive lens component is disposed on the most object side in said third lens unit.

6. The zoom lens system according to claim 1 or 2, wherein a negative lens component having an airspace on the object side is disposed on the most image side in said third lens unit.

7. The zoom lens system according to claim 1, 2 or 3, wherein said third lens unit consists, in order from the object side, of a positive lens component, a positive lens component and a negative lens component having a concave surface on the object side.

8. The zoom lens system according to claim 5, wherein the positive lens component disposed on the most object side in said third lens unit consists of a lens element.

9. The zoom lens system according to claim 6, wherein the negative lens component disposed on the most image side in said third lens unit consists of a lens element.

10. The zoom lens system according to claim 7, wherein curvature on a surface which is opposed to an object side surface of the negative lens component of said third lens unit with an airspace interposed is lower than that on this object side surface.

11. The zoom lens system according to claim 1, 2 or 3, wherein the front subunit of said fourth lens unit consists of a positive lens component and the rear subunit consists of a negative lens component.

12. The zoom lens system according to claim 11, wherein the negative lens component of the rear subunit of said fourth lens unit has an aspherical surface which has such a shape so as strengthen negative refractive power as portions of the aspherical surface are farther from an optical axis.

13. The zoom lens system according to claim 12, wherein the aspherical surface of said negative lens component of said fourth lens unit is formed by disposing resin on a lens element.

14. The zoom lens system according to claim 1 or 2, wherein said second lens unit consists, in order from the object side, of a negative lens component, a negative lens component and a positive lens component which are arranged with an airspace interposed between each pair of the lens components.

15. The zoom lens system according to claim 14, wherein the negative lens component disposed on the most object side in said second lens unit has an aspherical surface.

16. The zoom lens system according to claim 14, wherein each of the lens components of said second lens unit consists of a lens element.

17. The zoom lens system according to claim 1 or 2, wherein said second lens unit consists, in order from the object side, of a negative lens component, a negative lens component, a positive lens component and a negative lens component which are disposed with an airspace reserved between each pair of the lens components.

18. The zoom lens system according to claim 17, wherein each of the lens component of said second lens unit consists of a lens element.

19. The zoom lens system according to claim 17 satisfying the following condition (5):

$$-0.07 \leq h/R_{2G} \leq 0.35 \tag{5}$$

wherein a reference symbol $R_{2G}$ represents a radius of curvature of a most object side surface of the second lens unit.

20. The zoom lens system according to claim 1, wherein said first lens unit consists, in order from the object side, of a positive lens element, a negative lens element and a positive meniscus lens element having a convex surface on the object side.

21. The zoom lens system according to claim 3 or 20, wherein the negative lens element and the positive lens element of said first lens unit satisfy the following condition (6):

$$0 \leq D_2/h \leq 0.035 \tag{6}$$

wherein a reference symbol $D_2$ represents an airspace between the first lens element and the second lens element of the first lens unit.

22. The zoom lens system according to claim 21, wherein the negative lens element and the positive lens element of said first lens unit are cemented to each other so as to form a cemented lens component.

23. The zoom lens system according to claim 3, wherein said second lens unit satisfies the following condition (2):

$$0.07 < |f_2|/f_T < 0.16 \tag{2}$$

wherein a reference symbol $f_T$ represents a focal length of the zoom lens system as a whole at the tele position.

24. The zoom lens system according to claim 1 or 3 satisfying, in place of the condition (3), the following condition (3-2).

$$0.14 < D_4/h < 0.5 \tag{3-2}$$

25. The zoom lens system according to claim 3 satisfying, in place of the condition (1), the following condition (1-2):

$$4.3 < f_1/|f_2| < 4.9 \tag{1-2}$$

26. The zoom lens system according to claim 1 or 2 satisfying the following condition (4):

$$0.2 < f_3/f_4 < 1.1 \tag{4}$$

wherein reference symbols $f_3$ and $f_4$ represent focal lengths of the third lens unit and the fourth lens unit respectively.

27. The zoom lens system according to claim 1, 2 or 3 having a field angle exceeding 65° at the wide position.

28. An image pickup apparatus comprising the zoom lens system according to claim 1, 2 or 3, wherein optical path splitting means is disposed on the image side of said zoom lens system, one of optical paths split by the optical path splitting means is used as a photographic optical path and the other optical path is used as a view finder optical path in which an observing view finder is disposed.

29. The zoom lens system according to claim 1 or 2, wherein said third lens unit consists, in order from the object side, of a subunit having positive refractive power and a negative lens element which is disposed with an airspace reserved between said subunit and the negative lens element.

* * * * *